(12) United States Patent
Takeda et al.

(10) Patent No.: US 11,405,949 B2
(45) Date of Patent: Aug. 2, 2022

(54) TERMINAL AND RADIO COMMUNICATION METHOD FOR PERFORMING A RANDOM ACCESS PROCEDURE

(71) Applicant: NTT DOCOMO, INC., Tokyo (JP)

(72) Inventors: Kazuki Takeda, Tokyo (JP); Kazuaki Takeda, Tokyo (JP); Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 124 days.

(21) Appl. No.: 15/753,730

(22) PCT Filed: Aug. 19, 2016

(86) PCT No.: PCT/JP2016/074164
§ 371 (c)(1),
(2) Date: Feb. 20, 2018

(87) PCT Pub. No.: WO2017/033837
PCT Pub. Date: Mar. 2, 2017

(65) Prior Publication Data
US 2018/0242354 A1    Aug. 23, 2018

(30) Foreign Application Priority Data

Aug. 21, 2015 (JP) .............................. JP2015-164189

(51) Int. Cl.
*H04J 3/00* (2006.01)
*H04W 74/00* (2009.01)
(Continued)

(52) U.S. Cl.
CPC ......... *H04W 74/004* (2013.01); *H04W 74/04* (2013.01); *H04W 74/0833* (2013.01); *H04W 76/10* (2018.02); *H04W 72/0446* (2013.01)

(58) Field of Classification Search
CPC .................................................. H04W 74/004
See application file for complete search history.

(56) References Cited

U.S. PATENT DOCUMENTS 8,462,688 B1 *  6/2013  Dinan ................. H04W 72/005
                                                            370/312
9,854,609 B2 * 12/2017  Yang .................... H04W 74/08
(Continued)

FOREIGN PATENT DOCUMENTS

JP    2014-27429 A    2/2014
WO   2013/158511 A1  10/2013

OTHER PUBLICATIONS

International Search Report of the International Searching Authority issued in PCT/JP2016/074164 dated Sep. 20, 2016 (1 page).
(Continued)

*Primary Examiner* — Guang W Li
(74) *Attorney, Agent, or Firm* — Osha Bergman Watanabe & Burton LLP

(57) ABSTRACT

This invention aims to appropriately perform random access even when a shortened TTI is used. A user terminal includes a control section which controls communication using cells including at least two cells having different TTIs (Transmission Time Intervals), a transmission section which transmits a random access preamble, and a reception section which receives a response signal to the random access preamble, wherein the control section performs control to receive in a second cell, the response signal to the random access preamble transmitted in a first cell.

4 Claims, 14 Drawing Sheets

(51) Int. Cl.
*H04W 76/10* (2018.01)
*H04W 74/04* (2009.01)
*H04W 74/08* (2009.01)
*H04W 72/04* (2009.01)

(56) References Cited

U.S. PATENT DOCUMENTS

| | | | |
|---|---|---|---|
| 2009/0201873 A1 | 8/2009 | Korhonen et al. | |
| 2009/0232095 A1* | 9/2009 | Ahn | H04W 74/006 370/331 |
| 2012/0300714 A1* | 11/2012 | Ng | H04W 74/0833 370/329 |
| 2013/0010711 A1* | 1/2013 | Larsson | H04W 56/0005 370/329 |
| 2013/0058315 A1* | 3/2013 | Feuersanger | H04W 52/327 370/336 |
| 2013/0188473 A1* | 7/2013 | Dinan | H04W 48/00 370/216 |
| 2013/0294310 A1* | 11/2013 | Yi | H04W 72/042 370/311 |
| 2014/0056251 A1 | 2/2014 | Ahn et al. | |
| 2014/0071954 A1* | 3/2014 | Au | H04W 72/0446 370/336 |
| 2014/0112254 A1* | 4/2014 | Lindoff | H04W 74/002 370/328 |
| 2014/0112276 A1 | 4/2014 | Ahn et al. | |
| 2014/0160926 A1* | 6/2014 | Gage | H04W 74/0833 370/328 |
| 2014/0334448 A1* | 11/2014 | Langereis | H04W 28/18 370/331 |
| 2015/0172034 A1 | 6/2015 | Kishiyama et al. | |
| 2015/0305014 A1* | 10/2015 | Li | H04J 3/1694 370/330 |
| 2016/0029358 A1* | 1/2016 | Hou | H04B 7/0695 370/329 |
| 2016/0143064 A1* | 5/2016 | Cho | H04W 74/0858 370/329 |
| 2016/0226650 A1* | 8/2016 | Chen | H04L 5/14 |
| 2016/0345311 A1* | 11/2016 | Chen | H04W 72/0446 |
| 2017/0290008 A1* | 10/2017 | Tooher | H04L 1/1893 |
| 2018/0035469 A1* | 2/2018 | Chen | H04W 72/10 |
| 2018/0035470 A1* | 2/2018 | Chen | H04W 72/1284 |
| 2018/0098337 A1* | 4/2018 | Lee | H04W 72/042 |
| 2018/0103504 A1* | 4/2018 | Quan | H04W 52/0216 |
| 2018/0167980 A1* | 6/2018 | Shi | H04W 72/048 |
| 2018/0176934 A1* | 6/2018 | Uchino | H04W 72/1231 |
| 2018/0227958 A1* | 8/2018 | Xiong | H04L 5/0055 |
| 2018/0234998 A1* | 8/2018 | You | H04L 5/0053 |
| 2019/0014548 A1* | 1/2019 | Pelletier | H04W 52/246 |

OTHER PUBLICATIONS

Written Opinion of the International Searching Authority issued in PCT/JP2016/074164 dated Sep. 20, 2016 (3 pages).

3GPP TS 36.300 V12.4.0; "3rd Generation Partnership Project; Technical Specification Group Radio Access Network Evolved Universal Terrestrial Radio Access (E-UTRA) and Evolved Universal Terrestrial Radio Access Network (E-UTRAN); Overall description; Stage 2 (Release 12)"; Dec. 2014 (251 pages).

Extended European Search Report issued in the counterpart European Patent Application No. 16839184.5, dated Feb. 19, 2019 (9 pages).

Notice of Reasons for Refusal issued in Japanese Application No. 2017-536391, dated Jul. 7, 2020 (6 pages).

* cited by examiner

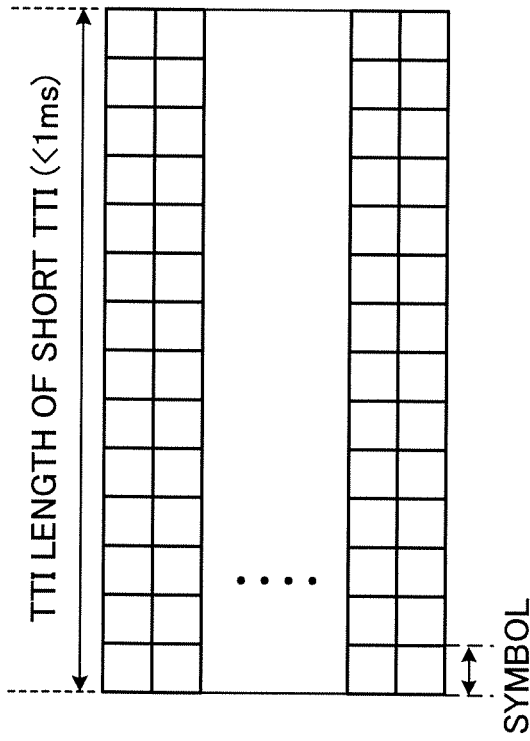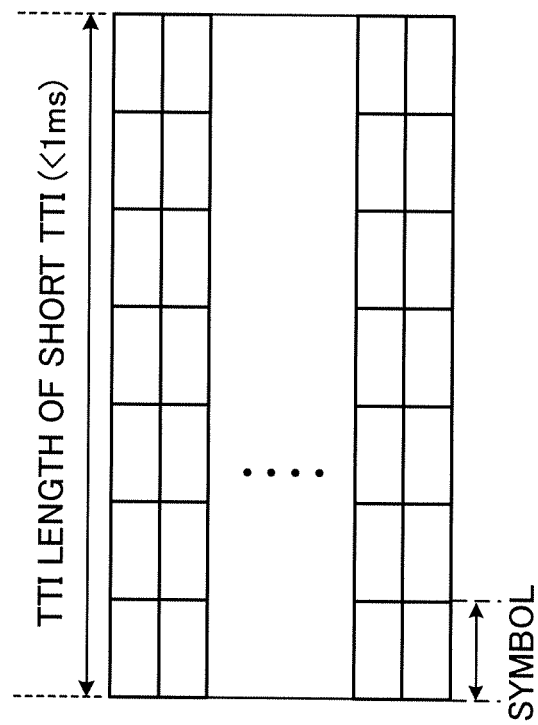
FIG. 3A
FIG. 3B

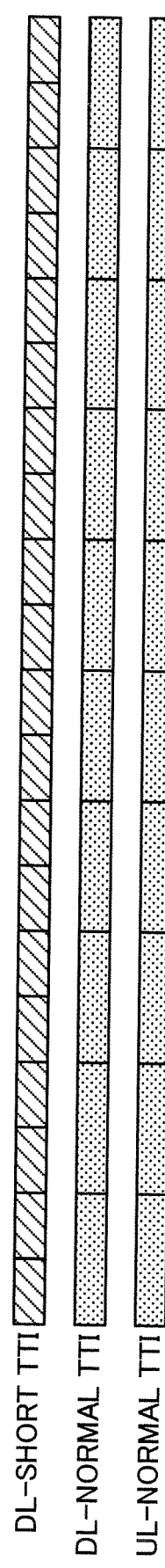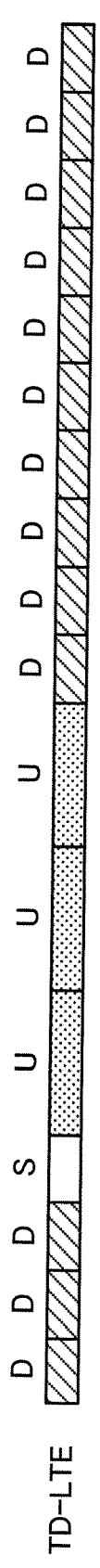

TERMINAL AND RADIO COMMUNICATION METHOD FOR PERFORMING A RANDOM ACCESS PROCEDURE

TECHNICAL FIELD

The present invention relates to a user terminal, a radio base station, and a wireless communication method for next-generation mobile communication systems.

BACKGROUND ART

In UMTS (Universal Mobile Telecommunications System) networks, LTE (Long Term Evolution) has been specified to achieve, e.g., higher data rates and lower delays (non-patent literature 1). To achieve broader bands and higher speeds than LTE (to be also referred to as LTE Rel. 8), LTE-Advanced (to be also referred to as LTE Rel. 10, 11, or 12) has been specified, and a successor system of LTE (to be also referred to as, e.g., LTE Rel. 13) is now under study.

In LTE Rel. 10/11, CA (Carrier Aggregation) which integrates CCs (Component Carriers) has been deployed to achieve broader bands. Each CC is configured with the system bandwidth of LTE Rel. 8 as a unit. Further, in CA, CCs for the same radio base station (eNB: eNodeB) are set in UE (User Equipment, User terminal).

In LTE Rel. 12, DC (Dual Connectivity) has also been deployed in which CGs (Cell Groups) for different radio base stations are set in a user terminal. Each cell group is formed by at least one cell (CC). DC integrates CCs for different radio base stations and is also called Inter-eNB CA or the like.

In LTE systems (Rel. 8-12), a random access procedure is supported to allow a user terminal to perform, e.g., initial connection, synchronization establishment, and communication restart. In the random access procedure, the user terminal is defined the operations and the like for transmitting a PRACH (Physical Random Access Channel) and receiving a random access response to the random access channel.

In LTE Rel. 8-12 as described above, the TTI (Transmission Time Interval) applied to DL transmission and UL transmission between a radio base station and a user terminal is set to 1 ms and controlled. The TTI is also called a transport time interval, and it is even called a subframe length in the LTE systems (Rel. 8-12).

CITATIONS LIST

Non-Patent Literature

Non-patent literature 1: 3GPP TS 36.300 "Evolved Universal Terrestrial Radio Access (E-UTRA) and Evolved Universal Terrestrial Radio Access Network (E-UTRAN); Overall description; Stage 2"

SUMMARY OF INVENTION

Technical Problem

Future wireless communication systems such as LTE Rel. 13 or later and 5G are expected to perform communication in high frequency bands such as several tens of gigahertz and relatively low-volume data communication such as IoT (Internet of Things), MTC (Machine Type Communication), or M2M (Machine To Machine). In such future wireless communication systems, when communication methods (e.g., a TTI (Transmission Time Interval) of 1 ms) in LTE Rel. 8-12 is used, it is probable that sufficient communication service may not be provided.

In view of this, future wireless communication systems may perform communication using a shortened TTI in which a iii is shortened to be less than 1 ms. Further, in this case, a user terminal is expected to be connected to cells which use different TTIs and perform communication (e.g., CA or DC). On the other hand, when a shortened TTI is used, a challenge is how to control the random access procedure. When, for example, a user terminal is connected to cells which use different TTIs and performs communication, a challenge is encountered in how to control the random access procedure.

The present invention has been made in consideration of the above-described issue, and has as one object to provide a user terminal, a radio base station, and a wireless communication method which can appropriately perform random access even when a shortened TTI is used.

Solution to Problem

An aspect of a user terminal according to the present invention includes a control section which controls communication using cells including at least two cells having different TTIs (Transmission Time Intervals), a transmission section which transmits a random access preamble, and a reception section which receives a response signal to the random access preamble, wherein the control section performs control to receive in a second cell, the response signal to the random access preamble transmitted in a first cell.

Advantageous Effects of Invention

According to the present invention, random access can be appropriately performed even when a shortened TTI is used.

BRIEF DESCRIPTION OF DRAWINGS

FIG. 3A is a diagram illustrating a first configuration example of a shortened TTI; and FIG. 3B is a diagram illustrating a second configuration example of a shortened TTI.

FIG. 4A is a diagram illustrating a first setting example of a shortened TTI; FIG. 4B is a diagram illustrating a second setting example of a shortened TTI; and FIG. 4C is a diagram illustrating a third setting example of a shortened TTI.

DESCRIPTION OF EMBODIMENTS

Existing LTE systems (Rel. 12 or earlier) perform random access by transmitting a PRACH (Physical Random Access Channel) by an uplink in, e.g., initial connection, synchronization establishment, and communication restart. Random access can be classified into two types: CBRA (Contention-Based Random Access) and Non-CBRA (Non-Contention-Based Random Access). Non-contention-based RA may also be called CFRA (Contention-Free Random Access).

In contention-based random access, a user terminal transmits by a PRACH, a preamble randomly selected from random access preambles (contention preambles) provided in a cell. In this case, contention may occur upon the use of the same random access preamble in several user terminals.

In non-contention-based random access, a user terminal transmits by a PRACH, a UE-specific random access preamble (dedicated preamble) allocated from a network in advance. In this case, no contention may occur because different random access preambles are allocated to individual user terminals.

Contention-based random access is done in, e.g., initial connection, or uplink communication start or restart. Non-contention-based random access is done in, e.g., a handover, or downlink communication start or restart.

Figure 1:
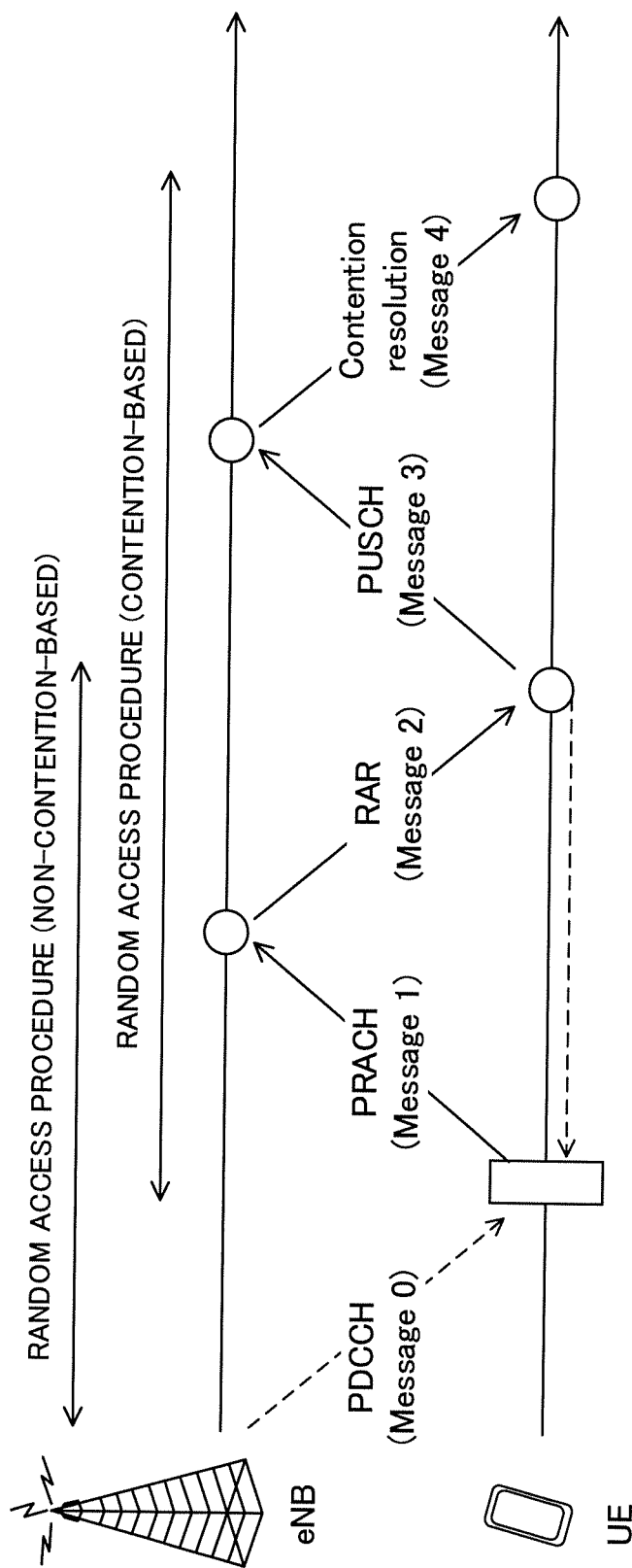
FIG. 1 is a diagram illustrating an exemplary random access procedure.

FIG. 1 illustrates an overview of random access. Contention-based random access is implemented by steps 1 to 4 and non-contention-based random access is implemented by steps 0 to 2.

In contention-based random access, first, a user terminal UE transmits a random access preamble (PRACH) (Msg (Message) 1) by a PRACH resource set in the cell. Upon detecting the random access preamble, a radio base station eNB transmits an RAR (Random Access Response) (Message 2) to the PRACH as a response thereto. The user terminal UE attempts to receive Message 2 in a predetermined interval after transmitting a random access preamble. When the user terminal UE fails to receive Message 2, it increases the PRACH transmission power and transmits (retransmits) Message 1 again. Increasing the transmission power in signal retransmission is also called power ramping.

Upon receiving the random access response, the user terminal UE transmits a data signal (Message 3) by a PUSCH (Physical Uplink Shared Channel) specified in an uplink grant included in the random access response. Upon receiving Message 3, the radio base station eNB transmits a contention resolution message (Message 4) to the user terminal UE. When the user terminal UE ensures synchronization by Messages 1 to 4 and identifies the radio base station eNB, it completes the contention-based random access processing and establishes connection.

In non-contention-based random access, first, a radio base station eNB transmits a PDCCH (Physical Downlink Control Channel) (Message 0) for issuing an instruction to a user terminal UE to transmit a PRACH. The user terminal UE transmits a random access preamble (PRACH) (Message 1) at a timing specified in the PDCCH. Upon detecting the random access preamble, the radio base station eNB transmits an RAR (Random Access Response) (Message 2) as response information to the PRACH. The user terminal completes the non-contention-based random access processing upon receiving Message 2. When the user terminal fails to receive Message 2, it increases the PRACH transmission power and transmits Message 1 again, as in contention-based random access.

PRACH random access preamble (Message 1) transmission will also be referred to as PRACH transmission, and PRACH random access response (Message 2) reception will also be referred to as PRACH reception.

The LTE systems perform timing control for each TAG (Timing Advance Group) in UL-CA (Uplink Carrier Aggregation) by multiple timing advance. Since, for each TAG, a primary cell is not always included, non-contention-based random access in a SCell (Secondary Cell) is deployed. However, part of random access control (e.g., RAR reception) is performed using a CSS (Common Search Space). Therefore, even when a PRACH is transmitted in a secondary cell, a reception operation may be preferably performed in a cell (e.g., a PCell (Primary Cell)) in which a common search space is set.

More specifically, when the user terminal receives a PRACH transmission instruction (PDCCH order), it transmits a random access preamble in a secondary cell which performs timing control. The user terminal then attempts to receive a response signal (e.g., a PDCCH) masked by an RA-RNTI (Random Access Radio Network Temporary Identifier) within a predetermined interval (reception window) in the common search space of a primary cell.

An RA-RNTI can be determined on the basis of the subframe number $t_{id}$ (e.g., 0 to 9) in which a random access preamble is transmitted, and the frequency resource number $f_{id}$ (e.g., 0 to 5). The predetermined interval (reception window) in which a response signal is transmitted is set to a predetermined range defined from a predetermined subframe or later after random access preamble transmission. An RA-RNTI and an RAR reception window can be respectively determined as, e.g.:

$$\text{RA-RNTI} = 1 + t_{id} + 10 \times f_{id} \qquad \text{Equation (1)}$$

$$\begin{array}{l}\text{RAR Reception Window=Range from Random Pre-}\\\text{amble Transmission+3 Subframes or later to}\\\text{Random Access Response Window Size}\end{array} \qquad \text{Equation (2)}$$

The random access response window size (ra-ResponseWindowSize) is notified from the radio base station to the user terminal using, e.g., upper layer signaling.

In this manner, when the cell (e.g., the secondary cell) that transmits a PRACH is different from the cell (e.g., the primary cell) that receives a response signal to the PRACH, the user terminal controls reception (e.g., the reception timing and decoding processing) of a response signal in accordance with, e.g., the subframe information (e.g., the subframe number) of the secondary cell that transmits the PRACH.

As described above, future wireless communication systems are expected to perform communication using a shortened TTI in which a TTI is shortened to be less than 1 ms. The TTI of the existing systems and the shortened TTI will be described below.

Figure 2:
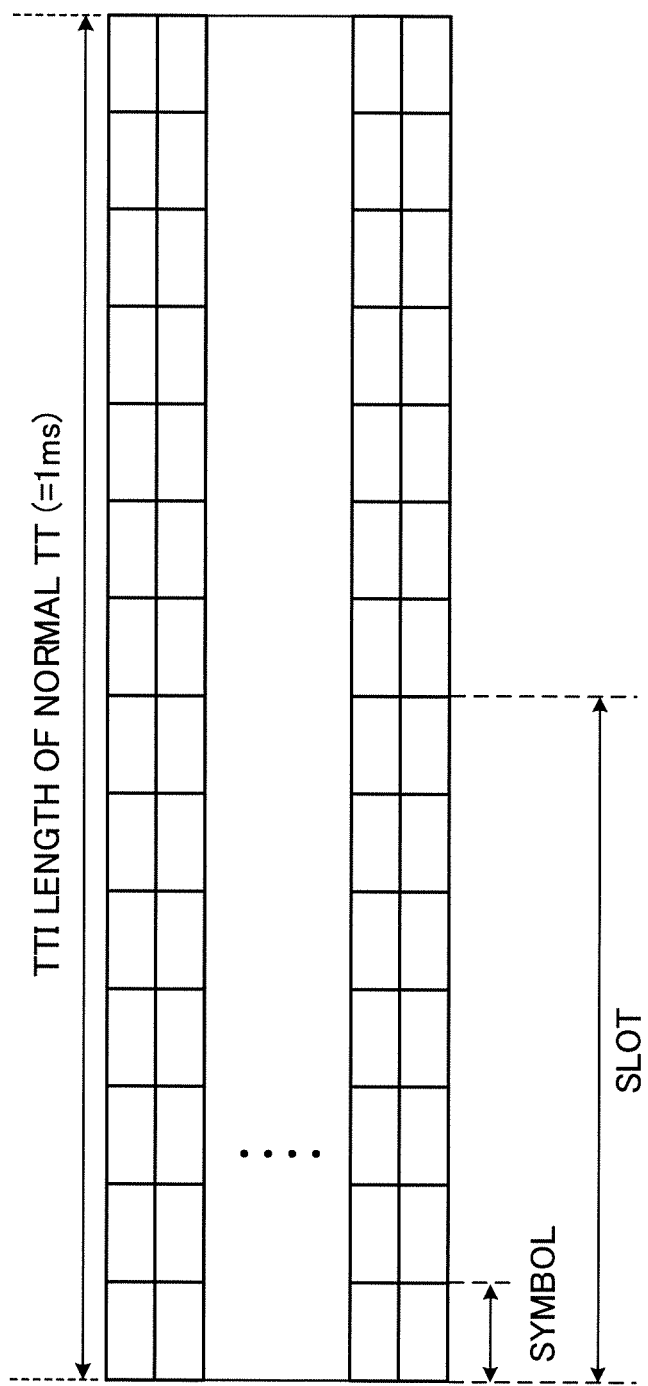
FIG. 2 is a diagram illustrating an exemplary TTI (Transmission Time Interval) in existing LTE systems (Rel. 8-12).

FIG. 2 is a diagram for explaining an exemplary TTI (Transmission Time Interval) in LTE Rel. 8-12. The TTI in LTE Rel. 8-12 (to be referred to as the "normal TTI" hereinafter) has a time length of 1 ms, as depicted in FIG. 2. The normal TTI is also called a subframe, which contains two time slots. The normal TTI is the unit of transmission time of one channel-encoded data packet (transport block) and represents the units of processing such as scheduling and link adaptation.

As illustrated in FIG. 2, in the normal CP (Cyclic Prefix) on a DL (Downlink), the normal TTI includes 14 OFDM (Orthogonal Frequency Division Multiplexing) symbols (seven OFDM symbols per slot). Each OFDM symbol has a time length (symbol length) of 66.7 µs and is added with the normal CP of 4.76 µs. Since the symbol length is the reciprocal of the subcarrier spacing, the subcarrier spacing is 15 kHz when the symbol length is 66.7 µs.

In the normal CP (Cyclic Prefix) on a UL (Uplink), the normal TTI includes 14 SC-FDMA (Single-Carrier Frequency Division Multiple Access) symbols (seven SC-FDMA symbols per slot). Each SC-FDMA symbol has a time length (symbol length) of 66.7 µs and is added with the normal CP of 4.76 µs. Since the symbol length is the reciprocal of the subcarrier spacing, the subcarrier spacing is 15 kHz when the symbol length is 66.7 µs.

In an extended CP, the normal TTI may include 12 OFDM symbols (or 12 SC-FDMA symbols). In this case, each OFDM symbol (or each SC-FDMA symbol) has a time length of 66.7 µs and is added with an extended CP of 16.67 µs.

Future wireless communication systems such as LTE Rel. 13 or later and 5G are desirably equipped with radio interfaces suitable for high frequency bands such as several tens of gigahertz, or radio interfaces which have a minimum delay with a small packet size to be suitable for relatively low-volume data communication such as IoT (Internet of Things), MTC (Machine Type Communication), or M2M (Machine To Machine).

Future communication systems may therefore perform communication using a shortened TTI in which a TTI is shortened to be less than 1 ms. When a TTI (to be referred to as a "shortened TTI" hereinafter) having a time length shorter than that of the normal TTI is used, the time margin for processing (e.g., encoding and decoding) in the user terminal and the radio base station increases, thus reducing the processing delay. When a shortened TTI is used, the number of user terminals which may be accommodated per unit time can also increase (e.g., 1 ms).

(Configuration Examples of Shortened TTIs)

Configuration examples of shortened TTIs will be described below with reference to FIG. 3. The shortened TTI has a time length (TTI length) smaller than 1 ms, as depicted in FIGS. 3A and 3B. The shortened TTI may be a TTI length of, e.g., 0.5 ms, 0.25 ms, 0.2 ms, or 0.1 ms whose multiple is 1 ms. Thus, a shortened TTI can be deployed while maintaining compatibility with the normal TTI of 1 ms.

Although FIGS. 3A and 3B exemplify the normal CP, the present invention is not limited to this. It suffices to set the shortened TTI to a time length shorter than the normal TTI, and any configuration may be applied to, e.g., the number of symbols, the symbol length, or the CP length in the shortened TTI. Although the use of OFDM symbols for a DL, and SC-FDMA symbols for a UL will be taken as an example below, the present invention is not limited to these examples.

FIG. 3A is a diagram illustrating a first configuration example of a shortened TTI. In the first configuration example, the shortened TTI includes 14 OFDM symbols (or SC-FDMA symbols) equal in number to those of the normal TTI, and each OFDM symbol (each SC-FDMA symbol) has a symbol length shorter than that (=66.7 µs) of the normal TTI, as illustrated in FIG. 3A.

As illustrated in FIG. 3A, when the symbol length is shortened while maintaining the number of symbols of the normal TTI, the physical layer signal structure of the normal TTI can be diverted. When the number of symbols of the normal TTI is maintained, the same amount of information (number of bits) as the normal TTI can be included even in the shortened TTI.

FIG. 3B is a diagram illustrating a second configuration example of a shortened TTI. In the second configuration example, the shortened TTI includes OFDM symbols (or SC-FDMA symbols) fewer than those of the normal TTI, and each OFDM symbol (each SC-FDMA symbol) has a symbol length (=66.7 µs) equal to that of the normal TTI, as illustrated in FIG. 3B. For example, referring to FIG. 3B, the shortened TTI includes seven OFDM symbols (SC-FDMA symbols) half the number of them in the normal TTI.

As illustrated in FIG. 3B, when the number of symbols is reduced while maintaining the symbol length, the amount of information (number of bits) included in the shortened TTI can be made smaller than that in the normal TTI. This allows the user terminal to perform reception processing (e.g., demodulation and decoding) for information included in the shortened TTI in a period of time shorter than that in the normal TTI, thus shortening the processing delay. In addition, a signal in the shortened TTI illustrated in FIG. 3B and a signal in the normal TTI can be multiplexed (e.g., OFDM-multiplexed) with the same CC, thus maintaining compatibility with the normal TTI.

(Setting Examples of Shortened TTIs)

Setting examples of shortened TTIs will be described below. When a shortened TTI is used, both the normal TTI and a shortened TTI may even be set in the user terminal to have compatibility with LTE Rel. 8-12. FIG. 4 illustrates diagrams of setting examples of the normal TTI and a shortened TTI. FIG. 4 merely illustrates examples, and the present invention is not limited to these examples.

FIG. 4A is a diagram illustrating a first setting example of a shortened TTI. The normal TTI and a shortened TTI may temporally coexist in the same CC (Component Carrier) (frequency domain), as illustrated in FIG. 4A. More specifically, a shortened TTI may be set in a specific subframe (or a specific radio frame) in the same CC. For example, referring to FIG. 4A, a shortened TTI is set in five consecutive subframes in the same CC and the normal TTI is set in other subframes. The number and positions of subframes in which a shortened TTI is set are not limited to those illustrated in FIG. 4A.

FIG. 4B is a diagram illustrating a second setting example of a shortened TTI. CA (Carrier Aggregation) or DC (Dual Connectivity) may be performed by integrating a CC for the normal TTI and a CC for a shortened TTI, as illustrated in FIG. 4B. More specifically, a shortened TTI may be set in a specific CC (more particularly, on a DL and/or a UL of a specific CC). For example, referring to FIG. 4B, a shortened 111 is set on a DL of a specific CC and the normal TTI is set on DLs and ULs of other CCs. The number and positions of CCs in which a shortened TTI is set are not limited to those illustrated in FIG. 4B.

In CA, a shortened TTI may be set in a specific CC (the P (Primary) cell or/and the S (Secondary) cell) of the same radio base station. In DC, a shortened TTI may be set in a specific CC (the P cell or/and the S cell) in an MCG (Master Cell Group) formed by a first radio base station, or set in a specific CC (the PS (Primary-Secondary) cell or/and the S cell) in an SCG (Secondary Cell Group) formed by a second radio base station.

FIG. 4C is a diagram illustrating a third setting example of a shortened TTI. A shortened TTI may be set in either a DL or a UL, as illustrated in FIG. 4C. For example, FIG. 4C illustrates a case where the normal TTI is set on a UL and a shortened TTI is set on a DL in the TDD system.

A specific channel or signal on a DL or a UL may be allocated (set) to the shortened TTI. For example, a PUCCH (Physical Uplink Control Channel) may be allocated to the normal TTI and a PUSCH (Physical Uplink Shared Channel) may be allocated to the shortened TTI.

In such setting examples of shortened TTI, the user terminal can set (or/and detect) a shortened TTI on the basis of implicit or explicit notification (e.g., broadcast information, RRC (Radio Resource Control) signaling, MAC (Medium Access Control) signaling, and PHY (Physical) signaling) from the radio base station.

As described above, future wireless communication is expected to be performed by applying a transmission time interval shorter than the normal TTI, i.e., a shortened TTI to UL transmission and/or DL transmission. Further, in future wireless communication, the user terminal may perform communication (e.g., CA or DC) using cells having different TTIs, as illustrated in FIG. 4B. However, how to control the random access procedure in such a case has not yet been established.

In view of this, the inventors of the present invention hit on the idea of using different cells to control PRACH transmission and reception of a response signal to the PRACH even when the user terminal performs communication using cells (or CCs, i.e., carriers) which use different TTIs (TTI lengths). These inventors hit on the idea of, e.g., a configuration which receives a response signal to PRACH transmission in a first cell (e.g., the secondary cell), using a second cell (e.g., the primary cell) in which a common search space is set.

The inventors of the present invention further hit on the idea of, when the user terminal connects to cells including at least two CCs having different TTIs, forming a CG (Cell Group) for each cell having the same TTI length to execute a random access procedure (e.g., non-contention-based random access) for each cell group. The inventors of the present invention hit on the idea of, when the user terminal uses a first cell and a second cell having different TTIs for PRACH transmission and reception of a response signal to the PRACH, allowing the user terminal to control reception of the response signal on the basis of the TTI of the first cell or the TTI of the second cell.

The present embodiment will be described in detail below. Although the case where the TTI of the existing LTE systems is 1 ms (1 subframe) and the shortened TTI is 0.5 ms (0.5 subframes) will be taken as an example hereinafter, the value of the shortened TTI is not limited to this. Since it suffices to set the shortened TTI shorter than the normal TTI of the existing LTE systems, the shortened TTI may be set not only to 0.5 ms but also to, e.g., 0.1 ms, 0.2 ms, 0.25 ms, 0.4 ms, 0.6 ms, 0.75 ms, or 0.8 ms.

Although the case where an RA-RNTI and a predetermined interval in which a response signal is received are calculated using equations (1) and (2) in processing for receiving a response signal to a PRACH will be taken as an example hereinafter, the present embodiment is not limited to this. Any equations different from equations (1) and (2) may be utilized as long as the above-described RA-RNTI and predetermined interval are determined using the TTI (subframe) number of a cell which transmits a PRACH and/or the TTI (subframe) number of a cell which receives a response signal.

The unit of transmission of a time length shorter than the normal TTI (1 ms) will be referred to as a shortened TTI hereinafter, but the term "shortened TTI" is not limited to such definition. Although the LTE systems will be taken as an example below, the present embodiment is not limited to this. The present embodiment is applicable to any communication system which uses a shortened TTI having a transmission time interval shorter than 1 ms and executes a random access procedure.

First Embodiment

In a first embodiment, when a user terminal communicates with cells including at least two cells (two CCs) having different TTIs, it controls the random access procedure (e.g., Non-CBRA) for each cell having the same TTI. The cells (or CCs, i.e., carriers) having different TTIs mean cells which use different TTI lengths in UL transmission and/or DL transmission.

Figure 5:
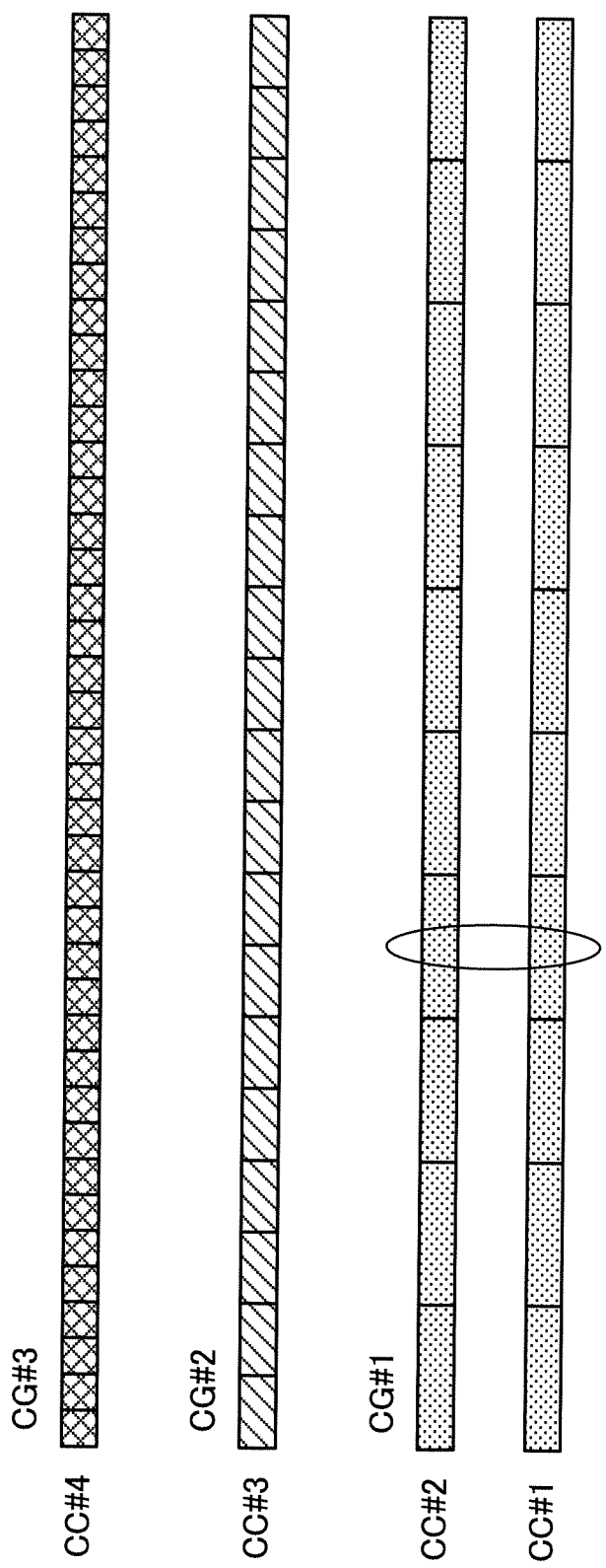
FIG. 5 is a diagram for explaining control of the random access procedure in a first embodiment.

FIG. 5 illustrates exemplary cells (CC #1-CC #4) connected to the user terminal. FIG. 5 illustrates a case where CC #1 and CC #2 have the same TTI (e.g., the normal TTI), CC #3 has a TTI (e.g., 0.5 ms) shorter than that of CC #1 and CC #2, and CC #4 has a TTI (e.g., 0.25 ms) shorter than that of CC #3. Neither the number of cells connected to the user terminal by CA or DC nor the TTI of each cell is not limited to this, as a matter of course.

The user terminal can control the random access procedure (e.g., non-contention-based) for each CG (Cell Group) formed by cells having the same TTI. In other words, the user terminal controls random access for each cell group, assuming that cells having different TTI is belong to different cell groups. In the case illustrated in FIG. 5, CC #1 and CC #2 having the same TTI can constitute a first cell group (CG #1), CC #3 can constitute a second cell group (CG #2), and CC #4 can constitute a third cell group (CG #3).

In this case, the user terminal monitors a common search space in a specific cell (e.g., the PCell or the PSCell) for each cell group to detect a response signal (a PDCCH for scheduling a response signal). When, for example, the user terminal transmits a PRACH in CC #2 serving as the secondary cell, a response signal (RAR) to the PRACH can be detected in CC #1 in which a common search space is set.

The user terminal further controls the timing of a random access operation on the basis of a uniform (common) TTI length in the cell group. For example, the user terminal can control the timing of a random access operation on the basis of the TTI (the normal TTI in this case) of CC #1 and CC #2 in the random access procedure of the first cell group (CG #1).

When the user terminal receives in CC #1, a response signal to a PRACH transmitted in CC #2, an RA-RNTI can be determined on the basis of the number of a TTI (or a subframe corresponding to the TTI) in PRACH transmission of CC #2. For example, the number of a TTI (or a subframe corresponding to the TTI) of CG #1 in PRACH transmission can be set as "$t_{id}$" in equation (1).

The predetermined interval (reception window) in which a response signal is detected can be determined as a predetermined interval calculated from the TTI length of CG #1 after PRACH transmission. For example, the user terminal may determine "3 Subframes" in equation (2) on the basis of the unit of a TTI (or a subframe corresponding to the TTI) of CG #1.

When the user terminal executes a random access procedure (e.g., reception of a response signal) in the second cell group or the third cell group, it controls the response signal reception timing and decoding processing on the basis of a shortened TTI used in the second cell group or the third cell group.

In this manner, controlling the random access procedure for each cell group formed by cells having the same TTI allows the user terminal to determine an RA-RNTI and a predetermined interval in which a response signal is detected and control random access, for each cell group. The user terminal can thus determine an RA-RNTI and a predetermined interval in which a response signal is detected, on the basis of one TTI, in random access within the same cell group.

Second Embodiment

In a second embodiment, when a user terminal communicates with cells including at least two cells having different TTIs, a cell which uses a first TTI transmits a PRACH, and a cell which uses a second TTI longer than the first TTI receives a response signal to the PRACH. As an example, a cell which uses a first TTI may be defined as a cell (e.g., a secondary cell) in which no common search space is set, and a cell which uses a second TTI may be defined as a cell (e.g., a primary cell) in which a common search space is set.

The user terminal can control a response signal reception operation (e.g., the reception timing and decoding processing) on the basis of the TTI (or a subframe corresponding to this TTI) of a cell which transmits a PRACH or the TTI (or a subframe corresponding to this TTI) of a cell which receives a response signal to the PRACH.

<Use of TTI of PRACH Transmission Cell>

Figure 6:
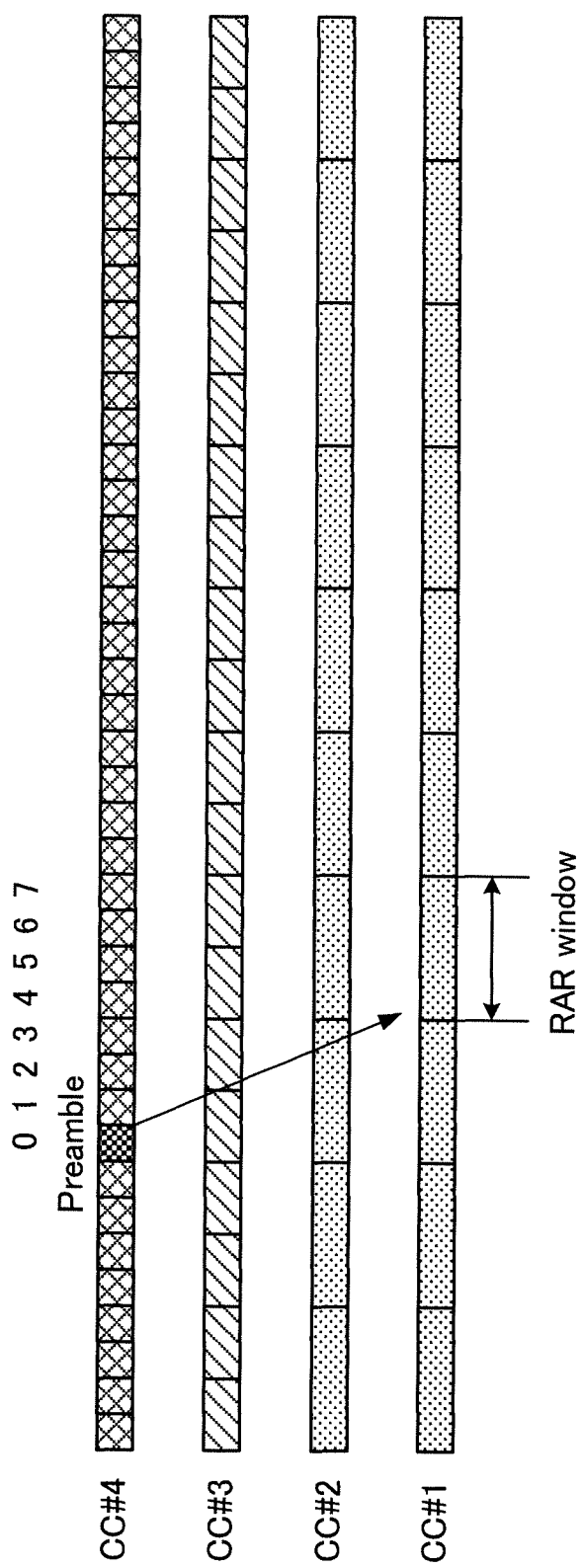
FIG. 6 is a diagram for explaining control of the random access procedure in a second embodiment.

FIG. 6 illustrates exemplary cells (CC #1-CC #4) connected to the user terminal. FIG. 6 illustrates a case where a cell (CC #4) which uses a first TTI transmits a PRACH and a cell (CC #1) which uses a second TTI longer than the first TTI receives a response signal to the PRACH. Neither the number of cells connected to the user terminal nor the TTI of each cell is not limited to this, as a matter of course.

In this case, the user terminal can receive in CC #1, a response signal to a PRACH transmitted in CC #4. Upon receiving the PRACH transmitted from the user terminal, a radio base station transmits to within a predetermined interval (reception window) a signal (e.g., a PDCCH in which a CRC is masked by an RA-RNTI) masked by a predetermined RA-RNTI from CC #1. The user terminal controls response signal reception processing on the basis of the TTI (or a subframe corresponding to this TTI) of the cell (CC #4) that transmits the PRACH.

More specifically, the user terminal can calculate an RA-RNTI on the basis of the number of the TTI (or a subframe corresponding to this TTI) of CC #4 in PRACH transmission. For example, the user terminal can use the subframe number (subframe #0 in this case) of CC #4 that transmits a PRACH as $t_{id}$ in equation (1).

A predetermined interval (reception window) in which a response signal is detected can be calculated on the basis of the TTI of CC #4 that transmits a PRACH. For example, subframes counted in the TTI of CC #4 can be set as "3 Subframes" in equation (2). Referring to FIG. 6, the user terminal detects a response signal within a predetermined interval set to three subframes (subframes #1 to #3) or later with the TTI of CC #4 as a unit after a subframe (subframe #0) in which a PRACH is transmitted.

In this manner, referring to FIG. 6, in receiving a response signal in a cell (CC #1) which uses a TTI longer than that of a cell (CC #4) which transmits a PRACH, response signal reception processing (e.g., determination of an RA-RNTI and/or a predetermined interval) is performed on the basis of the TTI of the cell that transmits the PRACH. This can reduce the delay of a response signal in accordance with the TTI of a CC which actually transmits a PRACH.

The user terminal may limit the subframes in which a PRACH is transmitted in a cell having a short TTI, in accordance with the TTI length of a CC which receives a response signal. In the case illustrated in, e.g., FIG. 6, a four-TTI (four-subframe) period can be set as the period of PRACH transmission with the TTI of CC #4 as a unit. This can avoid the situation in which a response signal is received immediately after PRACH transmission.

<Use of TTI of RAR Reception Cell>

Figure 7:
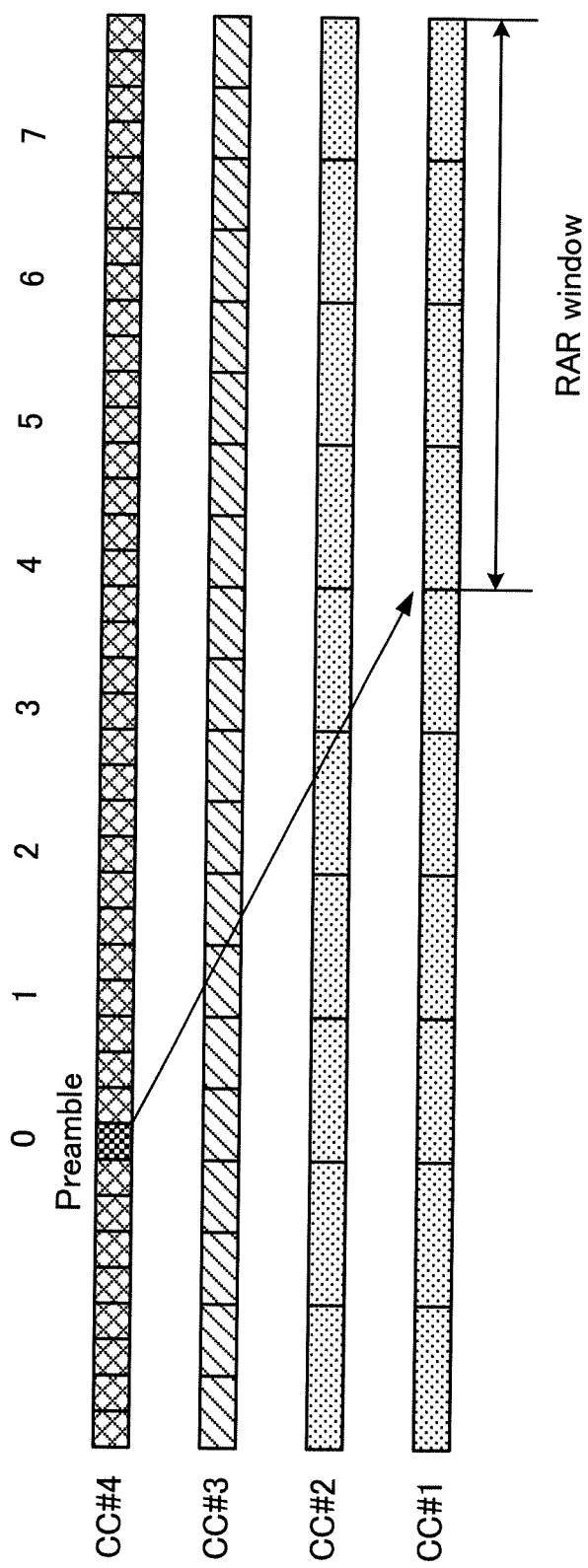
FIG. 7 is a diagram for explaining control of the random access procedure in the second embodiment.

FIG. 7 illustrates exemplary cells (CC #1-CC #4) connected to the user terminal. FIG. 7 illustrates a case where a cell (CC #4) which uses a first TTI transmits a PRACH and a cell (CC #1) which uses a second TTI longer than the first TTI receives a response signal to the PRACH.

In this case, the user terminal can receive in CC #1, a response signal to a PRACH transmitted in CC #4. Upon receiving the PRACH transmitted from the user terminal, a radio base station transmits to within a predetermined interval (reception window) a signal masked by a predetermined RA-RNTI from CC #1. The user terminal controls response signal reception processing on the basis of the TTI (or a subframe corresponding to this TTI) of the cell (CC #1) that receives the response signal.

More specifically, the user terminal can calculate an RA-RNTI on the basis of the number of the TTI (or a subframe corresponding to this TTI) of CC #1 in PRACH transmission. In other words, the user terminal determines an RA-RNTI on the basis of the TTI (subframe) number of not a cell which transmits a PRACH but a cell (CC #1) which receives a response signal. For example, the user terminal can use the subframe number of CC #1 in PRACH transmission of CC #4 as $t_{id}$ in equation (1).

A predetermined interval (reception window) in which a response signal is detected can be calculated on the basis of the TTI of CC #1 which receives a response signal to a PRACH. For example, subframes counted in the TTI of CC #1 can be set as "3 Subframes" in equation (2). Referring to FIG. 7, the user terminal detects a response signal in a reception window interval set to three subframes or later with the TTI of CC #1 as a unit after a subframe in which a PRACH is transmitted.

In this manner, referring to FIG. 7, in receiving a response signal in a cell (CC #1) which uses a TTI longer than that of a cell (CC #4) which transmits a PRACH, response signal reception processing is controlled on the basis of the TTI of the cell that receives the response signal. This can relax the conditions of a processing delay request involved in the random access procedure of the user terminal to simplify implementation circuits.

The user terminal may limit the subframes in which a PRACH is transmitted in a cell having a short TTI. In the case as illustrated in, e.g., FIG. 7, four consecutive TTIs of CC #4 correspond to one TTI of CC1. Even when the user terminal respectively transmits PRACHs in four TTIs of CC #4 corresponding to one TTI of CC #1, it calculates the same RA-RNTI and reception window. The user terminal can be configured to transmit a PRACH exclusively to the head TTI (subframe) of four TTIs of CC #4 corresponding to one TTI of CC #1. This can inhibit transmission of a PRACH in short TTIs (e.g., four TTIs of CC #4) corresponding to a long TTI (e.g., one TTI of CC #1) to avoid hindering PRACH separation (generating the same RA-RNTI and reception window).

Third Embodiment

In a third embodiment, when a user terminal communicates with cells including at least two cells having different TTIs, a cell which uses a first TTI transmits a PRACH and a cell which uses a second TTI shorter than the first TTI receives a response signal to the PRACH. As an example, a cell which uses a first TTI may be defined as a cell (e.g., a secondary cell) in which no common search space is set, and a cell which uses a second TTI may be defined as a cell (e.g., a primary cell) in which a common search space is set.

The user terminal can control a response signal reception operation (e.g., the reception timing and decoding processing) on the basis of the TTI (or a subframe corresponding to this TTI) of a cell which transmits a PRACH or the TTI (or a subframe corresponding to this TTI) of a cell which receives a response signal to the PRACH.

<Use of TTI of RAR Reception Cell>

Figure 8:
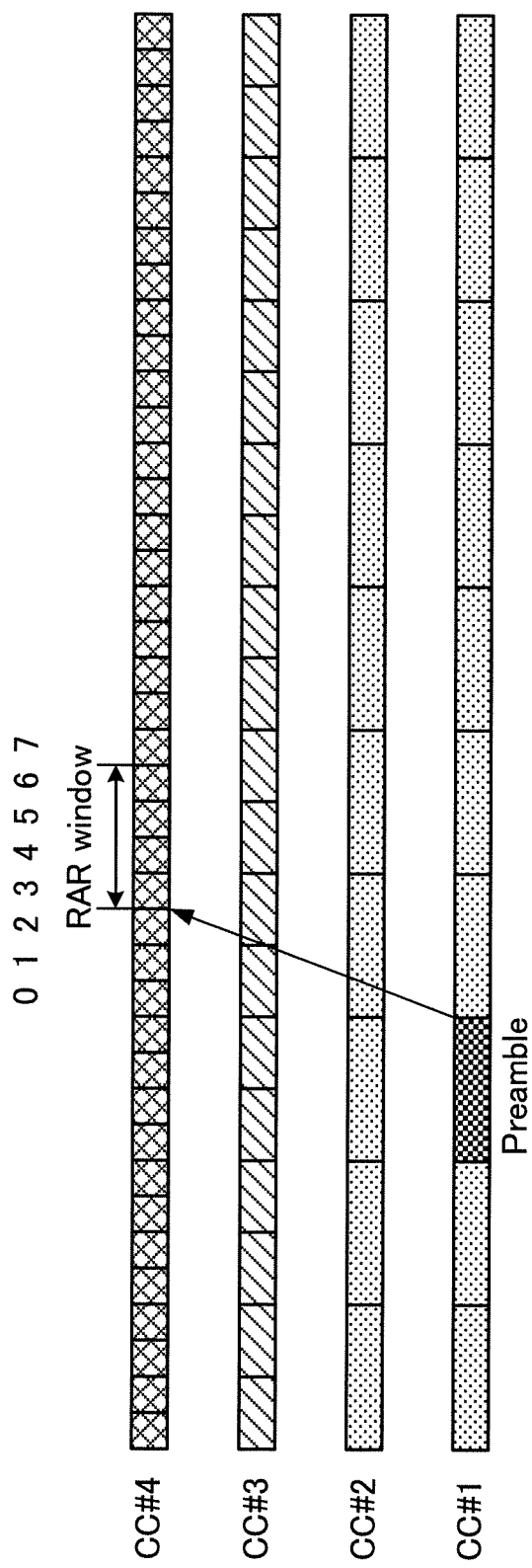
FIG. 8 is a diagram for explaining control of the random access procedure in a third embodiment.

FIG. 8 illustrates exemplary cells (CC #1-CC #4) connected to the user terminal. FIG. 8 illustrates a case where a cell (CC #1) which uses a first TTI transmits a PRACH and a cell (CC #4) which uses a second TTI shorter than the first TTI receives a response signal to the PRACH. Neither the number of cells connected to the user terminal by CA or DC nor the TTI of each cell is not limited to this, as a matter of course.

In this case, the user terminal can receive in CC #4, a response signal to a PRACH transmitted in CC #1. Upon receiving the PRACH transmitted from the user terminal, a radio base station transmits to within a predetermined interval (reception window) a signal masked by a predetermined RA-RNTI from CC #4. The user terminal controls response signal reception processing on the basis of the TTI (or a subframe corresponding to this TTI) of the cell (CC #4) that receives the response signal.

More specifically, the user terminal can calculate an RA-RNTI on the basis of the number of the TTI (or a subframe corresponding to this TTI) of CC #4 in PRACH transmission. In other words, the user terminal determines an RA-RNTI on the basis of the TTI (subframe) number of not a cell which transmits a response signal but a cell (CC #4) which receives a response signal. For example, the user terminal can use the subframe number of CC #1 in PRACH transmission of CC #4 as $t_{id}$ in equation (1).

A predetermined interval (reception window) in which a response signal is detected can be calculated on the basis of the TTI of CC #4 which receives a response signal to a PRACH. For example, subframes counted in the TTI of CC #4 can be set as "3 Subframes" in equation (2). Referring to FIG. 8, the user terminal detects a response signal in a predetermined interval set to three subframes (#0-#2) or later with the TTI of CC #4 as a unit after a subframe in which a PRACH is transmitted.

In this manner, referring to FIG. 8, in receiving a response signal in a cell (CC #4) which uses a TTI shorter than that of a cell (CC #1) which transmits a PRACH, response signal reception processing is controlled on the basis of the TTI of the cell that receives the response signal. Since a response signal can be received in accordance with the TTI length of a cell (CC) which receives the response signal, the delay of random access can be reduced.

<Use of TTI of PRACH Transmission Cell>

Figure 9:
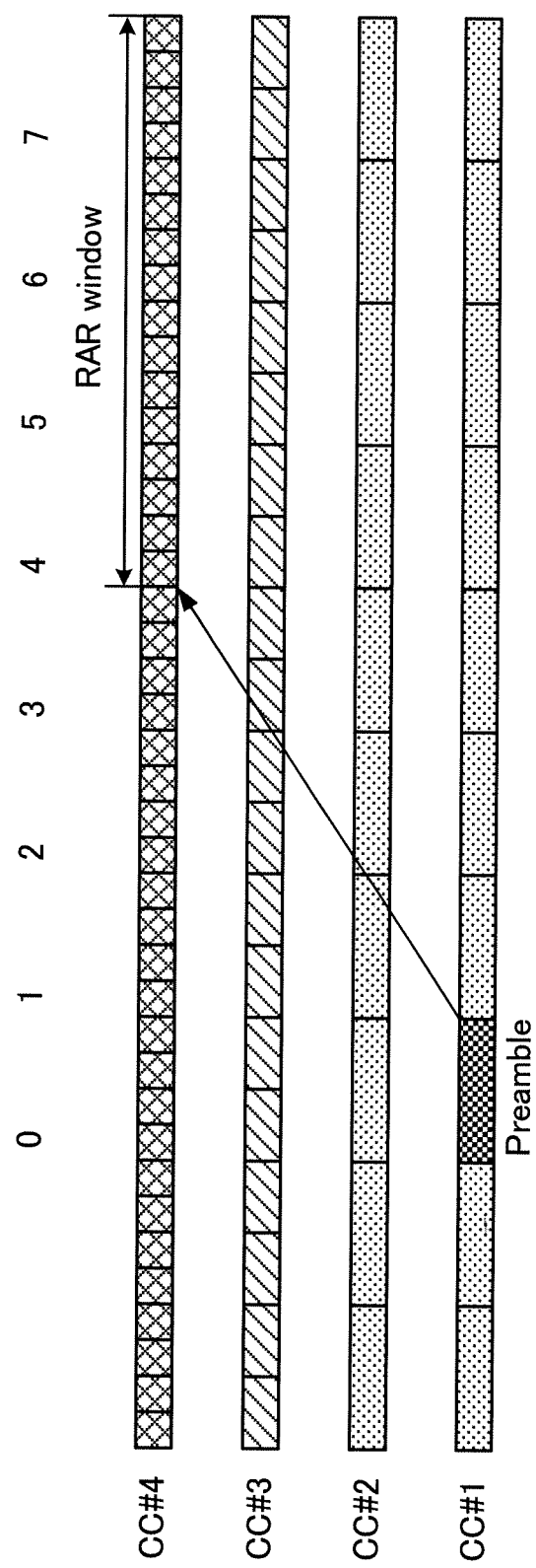
FIG. 9 is a diagram for explaining control of the random access procedure in the third embodiment.

FIG. 9 illustrates exemplary cells (CC #1-CC #4) connected to the user terminal. FIG. 9 illustrates a case where a cell (CC #1) which uses a first TTI transmits a PRACH and a cell (CC #4) which uses a second TTI longer than the first TTI receives a response signal to the PRACH.

In this case, the user terminal can receive in CC #4, a response signal to a PRACH transmitted in CC #1. Upon receiving the PRACH transmitted from the user terminal, a radio base station transmits to within a predetermined interval (reception window) a signal (e.g., a PDCCH in which a CRC is masked by an RA-RNTI) masked by a predetermined RA-RNTI from CC #4. The user terminal controls response signal reception processing on the basis of the TTI (or a subframe corresponding to this TTI) of the cell (CC #1) that transmits the PRACH.

More specifically, the user terminal can calculate an RA-RNTI on the basis of the number of the TTI (or a subframe corresponding to this TTI) of CC #1 in PRACH transmission. For example, the user terminal can use the subframe number (subframe #0 in this case) of CC #1 that transmits a PRACH as $t_{id}$ in equation (1).

A predetermined interval (reception window) in which a response signal is detected can be calculated on the basis of the TTI of CC #1 that transmits a PRACH. For example, subframes counted in the TTI of CC #1 can be set as "3 Subframes" in equation (2). Referring to FIG. 8, the user terminal detects a response signal in a reception window interval set to three subframes (subframes #1 to #3) or later with the TTI of CC #1 as a unit after a subframe (subframe #0) in which a PRACH is transmitted.

In this manner, referring to FIG. 9, in receiving a response signal in a cell (CC #4) which uses a TTI shorter than that of a cell (CC #1) which transmits a PRACH, response signal reception processing is controlled on the basis of the TTI of the cell that transmits the PRACH. This can relax the conditions of a processing delay request involved in the random access procedure of the user terminal to simplify implementation circuits.

(Wireless Communication System)

The configuration of a wireless communication system according to an embodiment of the present invention will be described below. The wireless communication method according to each of the above-mentioned aspects is applied to the wireless communication system. The wireless communication methods according to the above-mentioned respective aspects may be applied independently or in combination.

Figure 10:
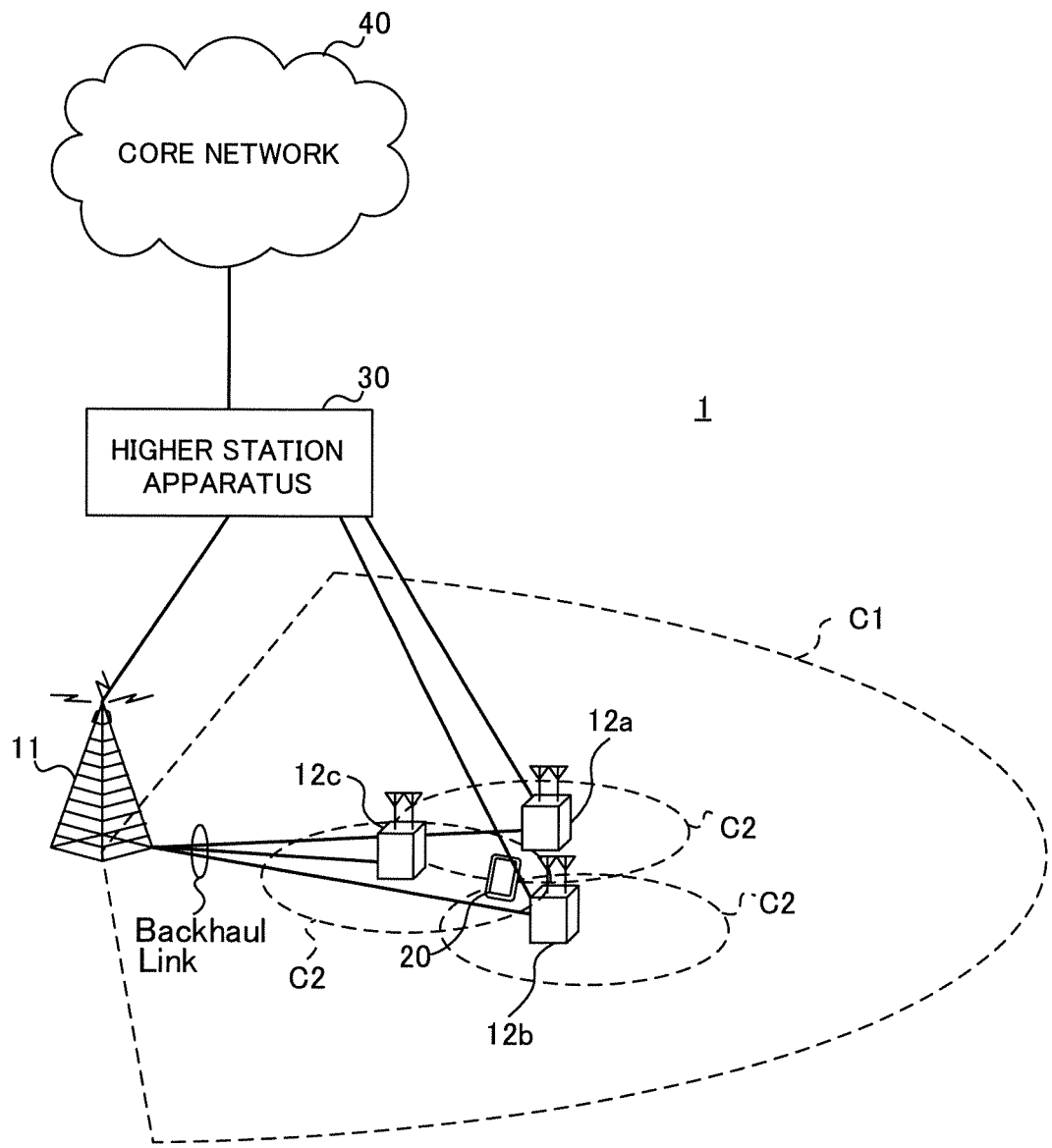
FIG. 10 is a schematic configuration diagram illustrating an exemplary schematic configuration of a wireless communication system according to the present embodiment.

FIG. 10 is a diagram illustrating an exemplary schematic configuration of a wireless communication system according to an embodiment of the present invention. In a wireless communication system 1, CA (Carrier Aggregation) and/or DC (Dual Connectivity) which integrates fundamental frequency blocks (component carriers) with the system bandwidth (e.g., 20 MHz) of the LTE systems as a unit is applicable. The wireless communication system 1 may be called, e.g., SUPER 3G, LTE-A (LTE-Advanced), IMT-Advanced, 4G, 5G, or FRA (Future Radio Access).

The wireless communication system 1 depicted in FIG. 10 includes a radio base station 11 forming a macrocell C1, and radio base stations 12a to 12c forming small cells C2 which are located in the macrocell C1 and more local than the macrocell C1. A user terminal 20 resides in the macrocell C1 and each small cell C2.

The user terminal 20 is connectable to both the radio base station 11 and the radio base stations 12. The user terminal 20 is expected to simultaneously use the macrocell C1 and the small cell C2 that use different frequencies by CA or DC. The user terminal 20 may employ CA or DC using cells (CCs) (e.g., six or more CCs). A shortened TTI is applicable to UL transmission and/or DL transmission between the user terminal 20 and the radio base station 11/radio base stations 12.

The user terminal 20 and the radio base station 11 can communicate with each other using a carrier (the existing carrier called, e.g., Legacy carrier) having a narrow bandwidth in a relatively low frequency band (e.g., 2 GHz). The user terminal 20 and the radio base stations 12 may communicate with each other using a carrier having a wide bandwidth in a relatively high frequency band (e.g., 3.5 or 5 GHz) or using the same carrier as in communication with the radio base station 11. The configuration of the frequency band used by each radio base station is not limited to this.

Wired connection (e.g., an X2 interface or an optical fiber conforming to the CPRI (Common Public Radio Interface)) or wireless connection may be established between the radio base station 11 and the radio base stations 12 (or between the two radio base stations 12).

The radio base station 11 and each radio base station 12 are respectively connected to a host station device 30 and further connected to a core network 40 via the host station device 30. Although the host station device 30 includes, e.g., an access gateway device, an RNC (Radio Network Controller), and an MME (Mobility Management Entity), the present invention is not limited to this. Each radio base station 12 may be connected to the host station device 30 via the radio base station 11.

The radio base station 11 has a relatively wide coverage and may be called, e.g., a macro base station, an aggregation node, an eNB (eNodeB), or a transmitting/receiving point. The radio base station 12 has a local coverage and may be called e.g., a small base station, a micro base station, a pico base station, a femto base station, an HeNB (Home eNodeB), an RRH (Remote Radio Head), or a transmitting/receiving point. The radio base stations 11 and 12 will be collectively referred to as radio base stations 10 hereinafter when no distinction is made between them.

Each user terminal 20 is a terminal that is compatible with various communication schemes such as LTE and LTE-A and may include not only mobile communication terminal but also fixed communication terminal.

The wireless communication system 1 uses as a radio access scheme, OFDMA (Orthogonal Frequency Division Multiple Access) for downlinks and SC-FDMA (Single-Carrier Frequency Division Multiple Access) for uplinks. OFDMA is a multicarrier transmission scheme for communication by dividing a frequency band into narrow frequency bands (subcarriers) and mapping data to each subcarrier. SC-FDMA is a single-carrier transmission scheme for dividing the system bandwidth into bands including one or continuous resource block for each terminal, and allowing these terminals to use different bands, thus alleviating inter-terminal interference. The uplink and downlink radio access schemes are not limited to these combinations and OFDMA may be used for uplinks.

The wireless communication system 1 uses, e.g., a PDSCH (Physical Downlink Shared Channel) shared by each user terminal 20, a PBCH (Physical Broadcast Channel), and a downlink L1/L2 control channel as downlink channels. The PDSCH is used to transmit, e.g., user data, upper layer control information, and an SIB (System Information Block). The PBCH is used to transmit an MIB (Master Information Block).

The downlink L1/L2 control channel includes, e.g., downlink control channels (a PDCCH (Physical Downlink Control Channel) and an EPDCCH (Enhanced Physical Downlink Control Channel)), a PCFICH (Physical Control Format Indicator Channel), and a PHICH (Physical Hybrid-ARQ Indicator Channel). The PDCCH is used to transmit, e.g. DCI (Downlink Control Information) including scheduling information of PDSCHs and PUSCHs. The PCFICH is used to transmit the number of OFDM symbols used in the PDCCH. The PHICH is used to transmit HARQ delivery acknowledgement information (ACK/NACK) for the PUSCH. The EPDCCH is frequency-division-multiplexed with the PDSCH (Physical Downlink Shared Channel) and used to transmit, e.g., DCI, like the PDCCH.

The wireless communication system 1 uses, e.g., a PUSCH (Physical Uplink Shared Channel) shared by each user terminal 20, a PUCCH (Physical Uplink Control Channel), and a PRACH (Physical Random Access Channel) as uplink channels. The PUSCH is used to transmit user data and upper layer control information. The PUSCH or the PUCCH is used to transmit UCI (Uplink Control Information) including at least one of, e.g., delivery acknowledgement information (ACK/NACK) and wireless quality information (CQI). The PRACH is used to transmit a random access preamble for establishing connection with a cell.

<Radio Base Station>

Figure 11:
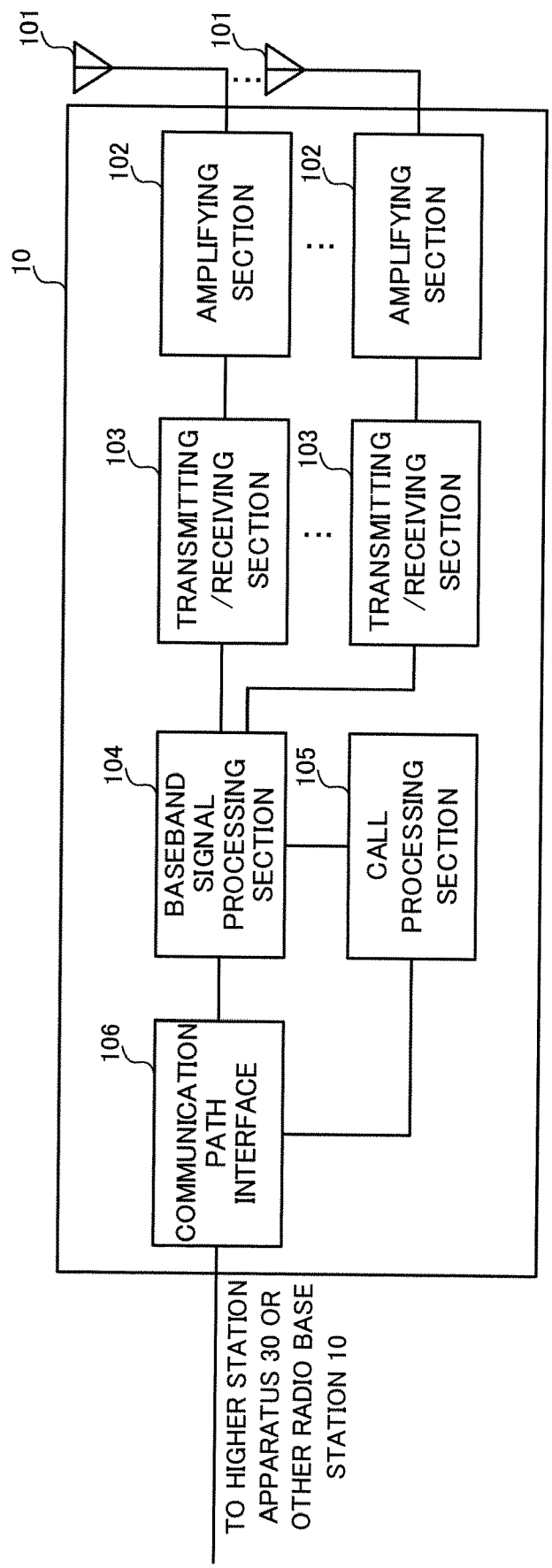
FIG. 11 is a diagram illustrating an exemplary configuration of an entire radio base station according to the present embodiment.

FIG. 11 is a diagram illustrating an exemplary configuration of an entire radio base station according to an embodiment of the present invention. The radio base station 10 includes transmitting/receiving antennas 101, amplification sections 102, transmitting/receiving sections 103, a baseband signal processing section 104, a call processing section 105, and a transmission line interface 106. The transmitting/receiving section 103 includes a transmission unit and a reception unit.

User data transmitted from the radio base station 10 to the user terminal 20 by a downlink is input from the host station device 30 to the baseband signal processing section 104 via the transmission line interface 106.

The baseband signal processing section 104 performs transmission processing for the user data, such as PDCP (Packet Data Convergence Protocol) layer processing, user data division and coupling, RLC (Radio Link Control) layer transmission processing such as RLC retransmission control, MAC (Medium Access Control) retransmission control (e.g., HARQ (Hybrid Automatic Repeat reQuest) transmission processing), scheduling, transport format selection, channel encoding, IFFT (Inverse Fast Fourier Transform) processing, and precoding processing, and transfers the user data to the transmitting/receiving sections 103. Transmission processing such as channel encoding and IFFT is also performed for downlink control signals, which are then transferred to the transmitting/receiving sections 103.

The transmitting/receiving section 103 converts a baseband signal precoded and output from the baseband signal processing section 104 for each antenna into a radio frequency band and transmits it. The radio frequency signal after frequency conversion by the transmitting/receiving section 103 is amplified by the amplification section 102 and transmitted from the transmitting/receiving antenna 101.

When the non-contention-based random access procedure is performed, the transmitting/receiving section (transmission section) 103 can transmit a PDCCH (Physical Downlink Control Channel) (Message 0) for issuing an instruction to transmit a PRACH. The transmitting/receiving section (reception section) 103 receives a random access preamble (PRACH) transmitted from the user terminal. The transmitting/receiving section (transmission section) 103 can further transmit a response signal (RAR) to a random access preamble transmitted from the user terminal. In doing this, the transmitting/receiving section 103 can perform control to transmit in a second cell, a response signal to a random access preamble received in a first cell. The transmitting/receiving section 103 may be implemented as a transmitter/receiver, a transmitting/receiving circuit, or a transmitting/receiving device described on the basis of a common understanding in the technical field according to the present invention. The transmitting/receiving section 103 may serve as an integrated transmitting/receiving section or include a transmission section and reception section.

As for uplink signals, a radio frequency signal received by the transmitting/receiving antenna 101 is amplified by the amplification section 102. The transmitting/receiving section 103 receives the uplink signal amplified by the amplification section 102. The transmitting/receiving section 103 performs frequency conversion of the received signal into a baseband signal and outputs it to the baseband signal processing section 104.

The baseband signal processing section 104 performs FFT (Fast Fourier Transform) processing, IDFT (Inverse Discrete Fourier Transform) processing, error correction decoding, MAC retransmission control reception processing, and RLC layer and PDCP layer reception processing, for user data contained in input uplink signals, and transfers the user data to the host station device 30 via the transmission line interface 106. The call processing section 105 performs call processing such as communication channel setup and release, state management of the radio base station 10, and radio resource management.

The transmission line interface 106 exchanges signals with the host station device 30 via a predetermined interface. The transmission line interface 106 may exchange signals with a neighboring radio base station 10 (backhaul signaling) via an interface between base stations (e.g., an X2 interface or an optical fiber conforming to the CPRI (Common Public Radio Interface)).

Figure 12:
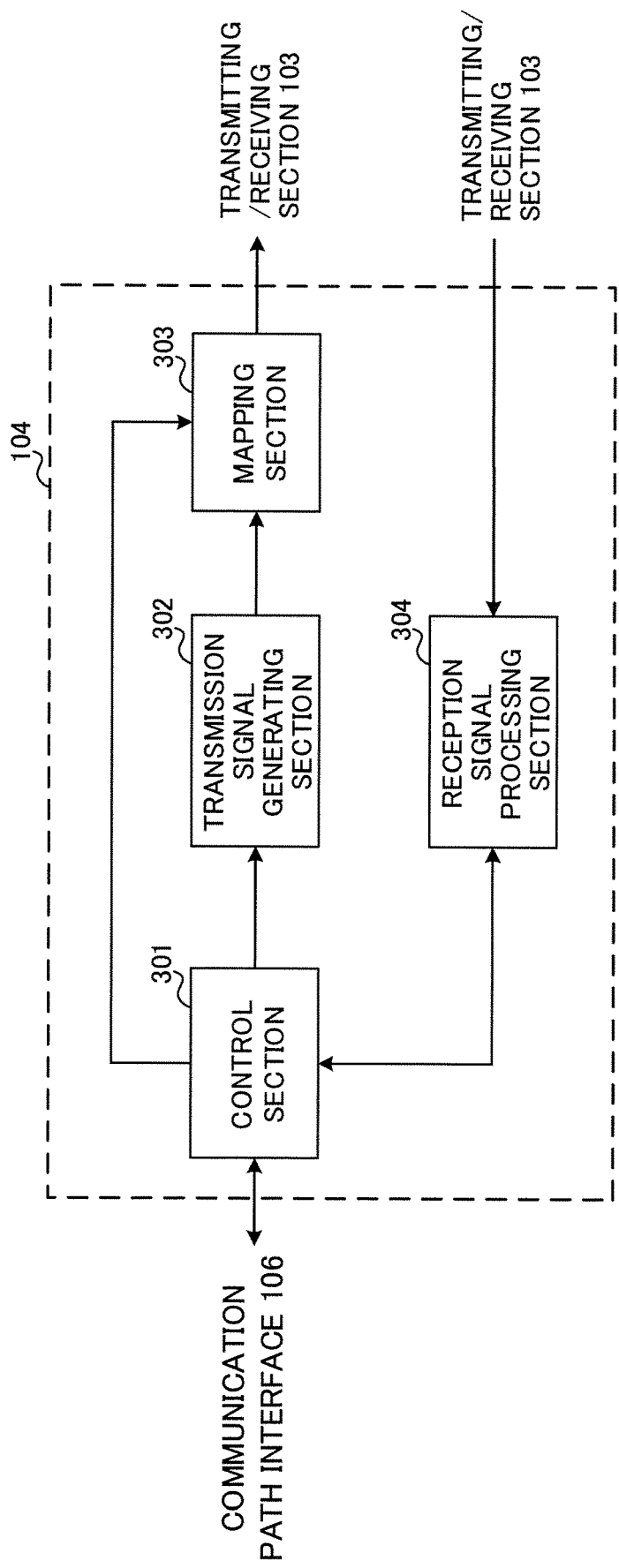
FIG. 12 is a diagram illustrating an exemplary functional configuration of the radio base station according to the present embodiment.

FIG. 12 is a diagram illustrating an exemplary functional configuration of the radio base station according to the present embodiment. FIG. 12 mainly illustrates functional blocks of feature portions in the present embodiment and the radio base station 10 also includes other functional blocks involved in wireless communication. The baseband signal processing section 104 includes a control section (scheduler) 301, a transmission signal generation section (generation unit) 302, a mapping section 303, and a received signal processing section 304, as illustrated in FIG. 12.

The control section (scheduler) 301 controls scheduling (e.g., resource assignment) of downlink data signals transmitted by PDSCHs and downlink control signals transmitted by PDCCHs and/or EPDCCHs. The control section 301 further controls scheduling of, e.g., system information, sync signals, paging information, CRSs (Cell-specific Reference Signals), and CSI-RSs (Channel State Information Reference Signals). The control section 301 even controls scheduling of, e.g., uplink reference signals, uplink data signals transmitted by PUSCHs, and uplink control signals transmitted by PUCCHs and/or PUSCHs.

The control section 301 controls response signal transmission (e.g., the transmission timing) on the basis of a random access preamble transmitted from the user terminal. The control section 301 further controls the TTI (Transmission Time Interval) used in DL signal reception and/or UL signal transmission. The control section 301 can even control a predetermined interval (reception window) used in response signal transmission, on the basis of the TTI of a cell in which the user terminal transmits a random access preamble or the TTI of a cell in which the user terminal receives a response signal. The control section 301 may be implemented as a controller, a control circuit, or a control device described on the basis of a common understanding in the technical field according to the present invention.

The transmission signal generation section 302 generates a DL signal (including a downlink data signal and a downlink control signal) on the basis of an instruction from the control section 301 and outputs it to the mapping section 303. More specifically, the transmission signal generation section 302 generates a downlink data signal (PDSCH) including user data and outputs it to the mapping section 303. The transmission signal generation section 302 further generates a downlink control signal (PDCCH/EPDCCH) including DCI (UL grant) and outputs it to the mapping section 303. The transmission signal generation section 302 further generates downlink reference signals such as a CRS and a CSI-RS and outputs them to the mapping section 303.

The transmission signal generation section 302 can even generate an RA-RNTI used for a response signal (e.g., a PDCCH) on the basis of the TTI of a cell in which the user terminal transmits a random access preamble or the TTI of a cell in which the user terminal receives a response signal. The transmission signal generation section 302 may be implemented as a signal generator, a signal generation circuit, or a signal generation device described on the basis of a common understanding in the technical field according to the present invention.

The mapping section 303 maps the DL signal generated by the transmission signal generation section 302 to a predetermined radio resource on the basis of an instruction from the control section 301 and outputs it to the transmitting/receiving section 103. The mapping section 303 may be implemented as a mapper, a mapping circuit, or a mapping device described on the basis of a common understanding in the technical field according to the present invention.

The received signal processing section 304 performs reception processing (e.g., demapping, demodulation, and decoding) for a UL signal (e.g., HARQ-ACK or a PUSCH) transmitted from the user terminal 20. The processing result is output to the control section 301.

The received signal processing section 304 may be implemented as a set of a signal processor, a signal processing circuit, or a signal processing device and a gauge, a measurement circuit, or a measurement device described on the basis of a common understanding in the technical field according to the present invention.

<User Terminal>

Figure 13:
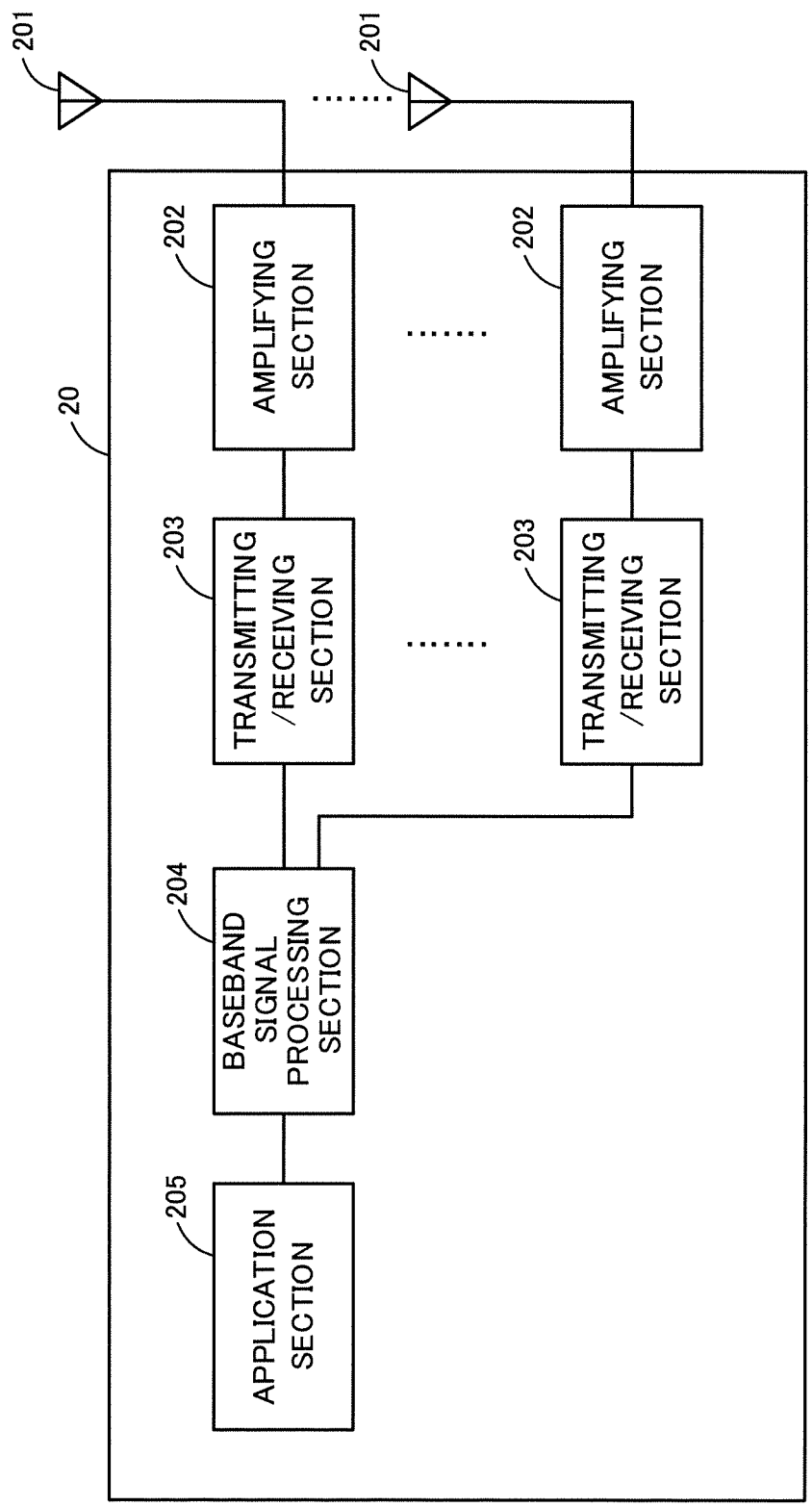
FIG. 13 is a diagram illustrating an exemplary configuration of an entire user terminal according to the present embodiment.

FIG. 13 is a diagram illustrating an exemplary configuration of an entire user terminal according to an embodiment of the present invention. The user terminal 20 includes transmitting/receiving antennas 201 for MIMO transmission, amplification sections 202, transmitting/receiving sections 203, a baseband signal processing section 204, and an application section 205. The transmitting/receiving section 203 may include a transmission unit and a reception unit.

Radio frequency signals received by the transmitting/receiving antennas 201 are respectively amplified by the amplification sections 202. Each transmitting/receiving section 203 receives downlink signals amplified by the amplification sections 202. The transmitting/receiving sections 203 perform frequency conversion of the received signals into baseband signals and output them to the baseband signal processing section 204.

The transmitting/receiving section (reception section) 203 receives DL data signals (e.g., a PDSCH), DL control signals (e.g., HARQ-ACK and a UL grant), and information (HARQ RTT) concerning the HARQ-ACK feedback timing when a shortened TTI is used. When the non-contention-based random access procedure is performed, the transmitting/receiving section (reception section) 203 can further receive a PDCCH (Physical Downlink Control Channel) (Message 0) for issuing an instruction to transmit a PRACH. The transmitting/receiving section (transmission section) 203 transmits a random access preamble (PRACH). The transmitting/receiving section (reception section) 203 can further receive a response signal (RAR) to the random access preamble. The transmitting/receiving section 203 may be implemented as a transmitter/receiver, a transmitting/receiving circuit, or a transmitting/receiving device described on the basis of a common understanding in the technical field according to the present invention.

The baseband signal processing section 204 performs, e.g., FFT processing, error correction decoding, and retransmission control reception processing for an input baseband signal. User data on a downlink is transferred to the application section 205. The application section 205 performs, e.g., processing associated with layers above a physical layer and a MAC layer. Broadcast information of the data on a downlink is also transferred to the application section 205.

User data on an uplink is input from the application section 205 to the baseband signal processing section 204. The baseband signal processing section 204 performs, e.g., retransmission control transmission processing (e.g., HARQ transmission processing), channel encoding, precoding, DFT (Discrete Fourier Transform) processing, and IFFT processing and transfers baseband signals to each transmitting/receiving section 203. The transmitting/receiving sections 203 convert the baseband signals output from the baseband signal processing section 204 into radio frequency bands and transmit them. The radio frequency signals after frequency conversion by the transmitting/receiving sections 203 are amplified by the amplification sections 202 and transmitted from the transmitting/receiving antennas 201.

Figure 14:
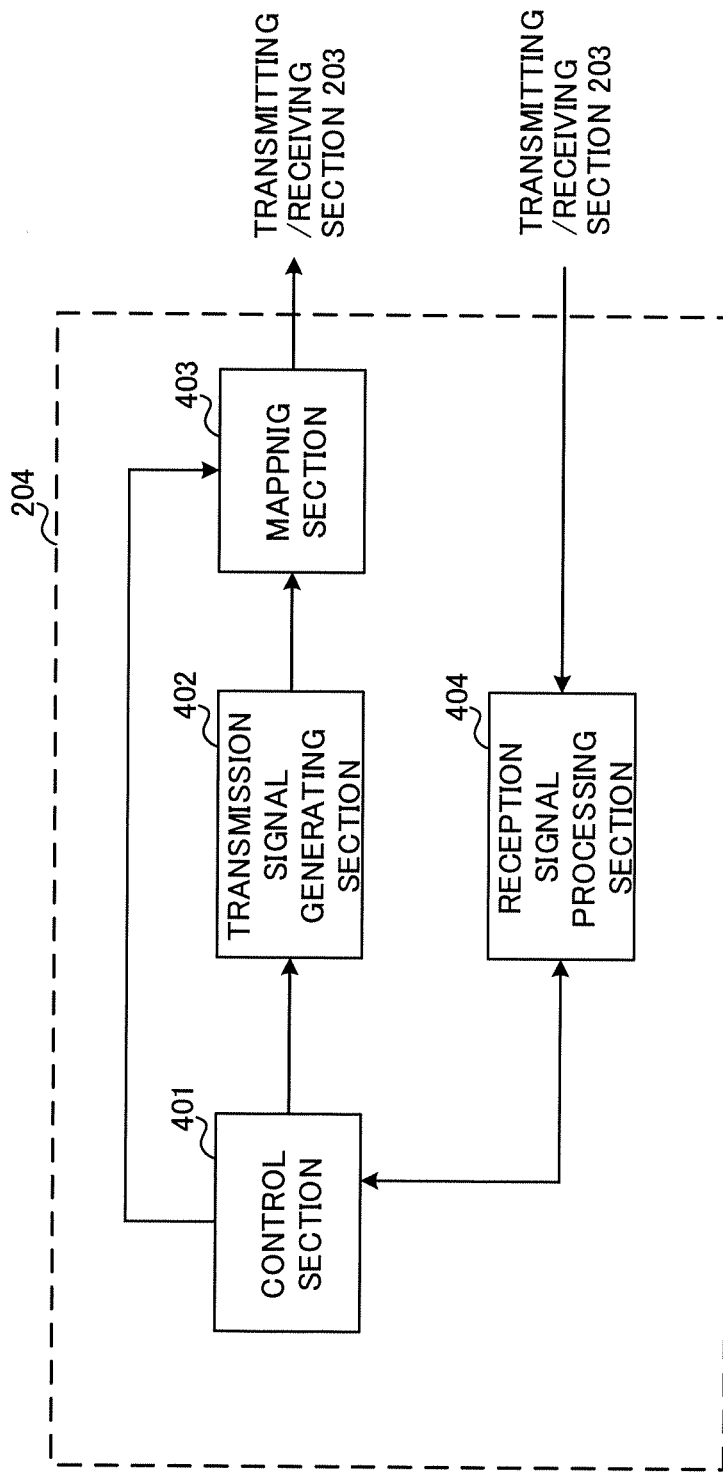
FIG. 14 is a diagram illustrating an exemplary functional configuration of the user terminal according to the present embodiment.

FIG. 14 is a diagram illustrating an exemplary functional configuration of the user terminal according to the present embodiment. FIG. 14 mainly illustrates functional blocks of feature portions in the present embodiment and the user terminal 20 also includes other functional blocks involved in wireless communication. The baseband signal processing section 204 of the user terminal 20 includes a control section 401, a transmission signal generation section 402, a mapping section 403, and a received signal processing section 404, as illustrated in FIG. 14.

The control section 401 controls communication (e.g., transmission and/or reception) using cells including at least two cells having different TTIs. More specifically, the control section 401 obtains from the received signal processing section 404, a downlink control signal (a signal transmitted by a PDCCH/EPDCCH) and a downlink data signal (a signal transmitted by a PDSCH) transmitted from the radio base station 10. The control section 401 controls generation of an uplink control signal (e.g., a delivery acknowledgement signal (HARQ-ACK)) and an uplink data signal on the basis of, e.g., the result of a decision as to whether retransmission control may be performed for the downlink control signal and the downlink data signal. More specifically, the control section 401 can control the transmission signal generation section 402, the mapping section 403, and the received signal processing section 404.

The control section 401 can control random access preamble transmission and response signal reception so that a second cell receives a response signal to a random access preamble transmitted in a first cell. The control section 401 can perform control to, e.g., receive a response signal in a second cell which uses a TTI equal to that of a first cell. In this case, the control section 401 can perform control not only to transmit a non-contention-based random access preamble for each group formed by cells which use the same TTI, but also to receive a response signal to the non-contention-based random access preamble in a specific cell.

When the TTI of a first cell which transmits a random access preamble is shorter than that of a second cell which receives a response signal, the control section 401 can control response signal reception on the basis of a first TTI or a subframe number corresponding to the first TTI (see FIG. 6). Alternatively, when the TTI of a first cell which transmits a random access preamble is shorter than that of a second cell which receives a response signal, the control section 401 can control response signal reception on the basis of a second TTI or a subframe number corresponding to the second TTI (see FIG. 7).

Or again, when the TTI of a first cell which transmits a random access preamble is longer than that of a second cell which receives a response signal, the control section 401 can control response signal reception on the basis of a first TTI or a subframe number corresponding to the first TTI (see FIG. 8). Alternatively, when the TTI of a first cell which transmits a random access preamble is longer than that of a second cell which receives a response signal, the control section 401 can control response signal reception on the basis of a second TTI or a subframe number corresponding to the second TTI (see FIG. 9).

The control section 401 can determine an RA-RNTI and/or a predetermined reception interval used in response signal reception, on the basis of the TTI of a first cell which transmits a random access preamble or a second TTI in which a response signal is received. The control section 401 may be implemented as a controller, a control circuit, or a control device described on the basis of a common understanding in the technical field according to the present invention.

The transmission signal generation section 402 generates a UL signal on the basis of an instruction from the control section 401 and outputs it to the mapping section 403. The transmission signal generation section 402 generates, e.g., a delivery acknowledgement signal (HARQ-ACK) and an uplink control signal such as channel state information (CSI) on the basis of instructions from the control section 401.

The transmission signal generation section 402 generates an uplink data signal on the basis of an instruction from the control section 401. When, for example, a UL grant is included in the downlink control signal notified from the radio base station 10, the transmission signal generation section 402 is instructed to generate an uplink data signal by the control section 401. The transmission signal generation section 402 may be implemented as a signal generator, a signal generation circuit, or a signal generation device described on the basis of a common understanding in the technical field according to the present invention.

The mapping section 403 maps the uplink signal (an uplink control signal and/or uplink data) generated by the transmission signal generation section 402 to a radio resource on the basis of an instruction from the control section 401 and outputs it to the transmitting/receiving section 203. The mapping section 403 may be implemented as a mapper, a mapping circuit, or a mapping device described on the basis of a common understanding in the technical field according to the present invention.

The received signal processing section 404 performs reception processing (e.g., demapping, demodulation, and decoding) for DL signals (e.g., a downlink control signal transmitted from the radio base station and a downlink data signal transmitted by a PDSCH). The received signal processing section 404 outputs information received from the radio base station 10 to the control section 401. The received signal processing section 404 outputs, e.g., broadcast information, system information, RRC signaling, and DCI to the control section 401.

The received signal processing section 404 may be implemented as a set of a signal processor, a signal processing circuit, or a signal processing device and a gauge, a measurement circuit, or a measurement device described on the basis of a common understanding in the technical field according to the present invention. The received signal processing section 404 may implement a reception unit according to the present invention.

The block diagrams used to describe the above-described embodiment represent blocks of functional sections. These functional blocks (constituent sections) are implemented in any combination of hardware and software. The means for implementing each functional block is not particularly limited. In other words, each functional block may be implemented as one physically coupled device or implemented by at least two physically separate devices connected in a wired or wireless manner.

Some or all of respective functions of the radio base station 10 and the user terminal 20, for example, may be implemented using hardware such as an ASIC (Application Specific Integrated Circuit), a PLD (Programmable Logic Device), or an FPGA (Field Programmable Gate Array). The radio base station 10 and the user terminal 20 may be implemented as a computer apparatus including a processor (CPU: Central Processing Unit), a communication interface for network connection, a memory, and a computer-readable storage medium holding a program. In other words, a radio base station, a user terminal, and the like according to an embodiment of the present invention may serve as computers which perform the processes of a wireless communication method according to the present invention.

The processor, the memory, and the like are connected to each other via buses for information communication. Examples of the computer-readable recording medium include storage media such as a flexible disk, a magnetooptical disk, a ROM (Read Only Memory), an EPROM (Erasable Programmable ROM), a CD-ROM (Compact Disc-ROM), a RAM (Random Access Memory), and a hard disk. The program may be transmitted from a network via an electrical communication line. The radio base station 10 and the user terminal 20 may include input devices such as input keys and output devices such as displays.

The functional configuration of the radio base station 10 and the user terminal 20 may be implemented as the above-mentioned hardware, as a software module executed by the processor, or as a combination thereof. The processor controls the overall user terminal by running the operating system. The processor reads out a program, a software module, and data from the storage medium to the memory and performs various processes in accordance with them.

The program may be any program which causes the computer to execute the respective operations described in the above-described respective embodiments. The control section 401 of the user terminal 20, for example, may be implemented as a control program stored in the memory and running on the processor, and the remaining functional blocks may be implemented similarly.

Software, instructions, and the like may be transmitted and received via transmission media. When, for example, software is transmitted from websites, servers, or other remote sources using wired technologies such as a coaxial cable, an optical fiber cable, a twisted pair, and a DSL (Digital Subscriber Line) and/or wireless technologies such as infrared, radio, and microwave technologies, these wired technologies and/or wireless technologies fall within the definition of the transmission media.

The terms described in this specification and/or the terms involved in understanding this specification may be replaced with terms having the same or similar meanings. The channels and/or symbols, for example, may be replaced with signals (signaling). The signals may be implemented as messages. The CCs (Component Carriers) may be referred to as carrier frequencies, cells, or the like.

The information, parameters, and the like described in this specification may be represented by absolute values, values relative to certain values, or other types of equivalent information. The radio resources, for example, may be indicated by indices.

The information, signals, and the like described in this specification may be represented using any of diverse techniques. Data, instructions, commands, information, signals, bits, symbols, chips, and the like that may be referred to throughout the above description, for example, may be represented by voltages, currents, electromagnetic waves, magnetic fields or particles, optical fields or photons, or any combination thereof.

The respective aspects/embodiments described in this specification may be used solely, used in combination, or switchably used upon execution. The notification of predetermined information (e.g., the notification of "X") is not limited to explicit notification, and may be done implicitly (e.g., without notification of the predetermined information).

The information notification is not limited to the aspects/embodiments described in this specification and may be done using other methods. The information notification may be done by, e.g., physical layer signaling (e.g., DCI (Downlink Control Information) and UCI (Uplink Control Information)), upper layer signaling (e.g., RRC (Radio Resource Control) signaling, MAC (Medium Access Control) signaling, and broadcast information (an MIB (Master Information Block) and an SIB (System Information Block))), other signals, or any combination thereof. The RRC signaling may also be referred to as RRC messages, which may include, e.g., RRC connection setup (RRCConnectionSetup) messages and RRC connection reconfiguration (RRCConnectionReconfiguration) messages.

The aspects/embodiments described in this specification may be applied to systems which utilize LTE (Long Term Evolution), LTE-A (LTE-Advanced), SUPER 3G, IMT-Advanced, 4G, 5G, FRA (Future Radio Access), CDMA2000, UMB (Ultra Mobile Broadband), IEEE 802.11 (Wi-Fi), IEEE 802.16 (Wi-MAX), IEEE 802.20, UWB (Ultra-Wide-Band), Bluetooth®, and systems using other types of appropriate systems, and/or next-generation systems extended on the basis of these systems.

The processing procedures, sequences, flowcharts, and the like of the aspects/embodiments described in this specification may be executed in different orders as long as consistency can be ensured. The method described in this specification, for example, presents elements of various steps in an exemplary order, and is not limited to the presented specific order.

Although the present invention has been described in detail above, it will be apparent for those skilled in the art that the present invention is not limited to the embodiments described in this specification. The present invention can be carried out as modifications and changed aspects without departing from the spirit and scope of the present invention defined by the description of the scope of claims. The description of the present invention is for illustrative purpose and is not intended to limit the present invention in any way.

This application is based on Japanese Patent Application No. 2015-164189 filed on Aug. 21, 2015, the contents of which are incorporated herein in their entirety.

The invention claimed is:

1. A terminal comprising:
    a transmitter that transmits a random access preamble, in a contention-based random access procedure, in a first cell among a plurality of cells supporting different time intervals;
    a processor that determines Random Access Radio Network Temporary Identifier (RA-RNTI) used for reception of a response signal to the random access preamble, based on a number of a first time interval in the first cell; and
    a receiver that receives the response signal, in a contention-based random access procedure, in a second cell,
    wherein the processor determines, based on a second time interval in the second cell, a Random Access Response (RAR) window to receive the response signal in the second cell, the response signal of which the RA-RNTI is determined based on the number of the first time interval in the first cell, and
    wherein the second time interval has a different time length from the first time interval.

2. The terminal according to claim 1, wherein the first cell is a secondary cell and the second cell is a primary cell.

3. A radio communication method comprising:
    transmitting a random access preamble, in a contention-based random access procedure, in a first cell among a plurality of cells supporting different time intervals;
    determining Random Access Radio Network Temporary Identifier (RA-RNTI) used for reception of a response signal to the random access preamble, based on a number of a first time interval in the first cell;
    receiving the response signal, in a contention-based random access procedure, in a second cell; and
    determining, based on a second time interval in the second cell, a Random Access Response (RAR) window to receive the response signal in the second cell, the response signal of which the RA-RNTI is determined based on the number of the first time interval in the first cell,
    wherein the second time interval has a different time length from the first time interval.

4. A system comprising:
    a terminal comprising:
        a transmitter that transmits a random access preamble, in a contention-based random access procedure, in a first cell among a plurality of cells supporting different time intervals;
        a first processor that determines Random Access Radio Network Temporary Identifier (RA-RNTI) used for reception of a response signal to the random access preamble, based on a number of a first time interval in the first cell; and
        a first receiver that receives the response signal, in a contention-based random access procedure, in a second cell,
        wherein the first processor determines, based on a second time interval in the second cell, a Random Access Response (RAR) window to receive the response signal in the second cell, the response signal of which the RA-RNTI is determined based on the number of a first time interval in the first cell, and
        wherein the second time interval has a different time length from the first time interval, and
    a base station comprising:
        a second receiver which receives the random access preamble transmitted from the terminal in the first cell; and
        a second processor which controls transmission of the response signal to the random access preamble in the second cell.

* * * * *